US012662929B1

(12) United States Patent
    Cuevas Maldonado et al.

(10) Patent No.: US 12,662,929 B1
(45) Date of Patent: Jun. 23, 2026

(54) GEOSTEERING CONTROL FRAMEWORK

(71) Applicant: Schlumberger Technology Corporation, Sugar Land, TX (US)

(72) Inventors: Nestor Herman Cuevas Maldonado, Sugar Land, TX (US); Hilde Grude Borgos, Stavanger (NO); Geir Vaaland Dahl, Stavanger (NO); Michael Hermann Nickel, Stavanger (NO); Diogo Salim, Sugar Land, TX (US); Kent Harms, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/216,457

(22) Filed: May 22, 2025

(51) Int. Cl.
    *E21B 44/00*      (2006.01)
    *E21B 47/18*      (2012.01)
    *E21B 49/00*      (2006.01)
    *G01V 11/00*      (2006.01)

(52) U.S. Cl.
    CPC .............. *E21B 44/00* (2013.01); *E21B 47/18* (2013.01); *E21B 49/00* (2013.01); *G01V 11/002* (2013.01)

(58) Field of Classification Search
    CPC . E21B 7/04; E21B 44/00; E21B 47/18; E21B 49/00
    See application file for complete search history.

(56) References Cited

U.S. PATENT DOCUMENTS

| | | | |
|---|---|---|---|
| 2013/0162440 A1* | 6/2013 | Parry | E21B 47/20 |
| | | | 340/854.3 |
| 2014/0297187 A1 | 10/2014 | Miotti | |
| 2015/0362623 A1 | 12/2015 | Miotti | |

(Continued)

FOREIGN PATENT DOCUMENTS

WO      2017142719 A1      8/2017

OTHER PUBLICATIONS

Bachrach, Ran, "Elastic and resistivity anisotropy of shale during compaction and diagenesis: Joint effective medium modeling and field observations", Geophysics, Nov.-Dec. 2011, pp. E175-E186, vol. 76, No. 6.

(Continued)

*Primary Examiner* — Tara Schimpf
*Assistant Examiner* — Lamia Quaim
(74) *Attorney, Agent, or Firm* — Kyle R. Miiller

(57)                ABSTRACT

A method can include receiving resistivity data acquired by a downhole tool of a drillstring disposed at least in part in a borehole in a subsurface environment, where the borehole includes a downhole end, and where the borehole defines a borehole axis; generating synthetic resistivity data for a region of the subsurface environment beyond the downhole end of the borehole, where the generating synthetic resistivity includes using at least a portion of the resistivity data; receiving seismic data for the subsurface environment, where the seismic data include spatial locations; inverting at least a portion of the resistivity data, at least a portion of the synthetic resistivity data, and at least a portion of the seismic (Continued)

data to estimate values for a number of physical properties of a portion of the subsurface environment that includes at least a portion of the region of the subsurface environment beyond the downhole end of the borehole; and controlling the drillstring using at least a portion of the values.

20 Claims, 17 Drawing Sheets

(56) References Cited

U.S. PATENT DOCUMENTS

| | | | |
|---|---|---|---|
| 2019/0024501 A1 | 1/2019 | Borgos | |
| 2019/0196039 A1* | 6/2019 | Wilson | G01V 3/30 |
| 2021/0041596 A1* | 2/2021 | Kushwaha | G06N 3/0455 |
| 2024/0151866 A1* | 5/2024 | Cuevas | G01V 1/301 |

OTHER PUBLICATIONS

Bachrach, Ran, "Joint estimation of porosity and saturation using stochastic rock physics modeling", Geophysics, 2006, pp. O53-O63, vol. 71, No. 5.

Barclay, F. et al., "Seismic inversion: Reading between the lines", Oilfield Review, 2008, pp. 42-63.

"Carcione, J. M. et al., Cross-property relations between electrical conductivity and the seismic velocity of rocks", Geophysics, Sep.-Oct. 2007, pp. E193-E204, vol. 72, No. 5.

Clavaud, Jean-Baptiste, "Intrinsic Electrical Anisotropy of Shale: The Effect of Compaction", Petrophysics, Jun. 2008, pp. 243-260, vol. 49, No. 3.

Dell AVERSANA, P. et al., "Joint inversion of rock properties from sonic, resistivity and density well-log measurements", Geophysical Prospecting, EAGE, 2011, pp. 1144-1154, vol. 59.

Giraud, J. et al., "Simultaneous joint inversion of electromagnetic and seismic full-waveform data: A sensitivity analysis to Biot parameter", 75th EAGE Conference & Exhibition, 2013, 5 pages.

Grana, D., "Joint facies and reservoir properties inversion", Geophysics, May-Jun. 2018, pp. M15-M24, vol. 83, No. 3.

Krief, M. et al., "A petrophysical interpretation using the velocities of P and S waves (Full-waveform sonic)", The Log Analyst, 1990, pp. 355-369.

Miotti, F. et al., "Estimation of rock properties from seismic, EM and gravity well-log measurements", EGM 2010 International Workshop, 2010, 5 pages.

Miotti, F. et al., "Petrophysical Joint Inversion of seismic and EM attributes: a case study", SEG Houston 2013 Annual Meeting, 2013, pp. 2516-2521.

Salim, D. C. et al., "Geosteering Driven by Geophysics—Reservoir Structure Prediction Ahead of Bit", Second EAGE/SPE Geosteering and Well Placement Workshop, Nov. 5-8, 2018, 4 pages.

Seydoux, J. et al., "Full 3D deep directional resistivity measurements optimize well placement and provide reservoir-scale imaging while drilling", Proceedings of the SPWLA 55th Annual Logging Symposium, May 18-22, 2014. 14 pagses.

Tarchiani, C. et al., "Novel While-drilling Workflow for Reservoir Structural Prediction ahead of the Bit", Proceedings of the 79th EAGE Conference & Exhibition 2017, Jun. 12-15, 2017, 5 pages.

* cited by examiner

System 100

Components 340

| Sensors 350 | Conductivity/ Dielectric 352 | Gamma 354 | Other 356 |

| Circuitry 360 | Processor 362 | Memory 364 | Other 366 |

Geosteering Actuator 370

400 —

— 410

Components 440

| Sensors 450 | Conductivity/ Dielectric 452 | Gamma 454 | Other 456 |

| Circuitry 460 | Processor 462 | Memory 464 | Other 466 |

Geosteering Actuator 470

404 —

600

Seismic Data 610

Downhole Data 620

Physical Properties 640

Reservoir Quality Metric 660

Planning, Re-Planning, Control, Etc. 680

700

800

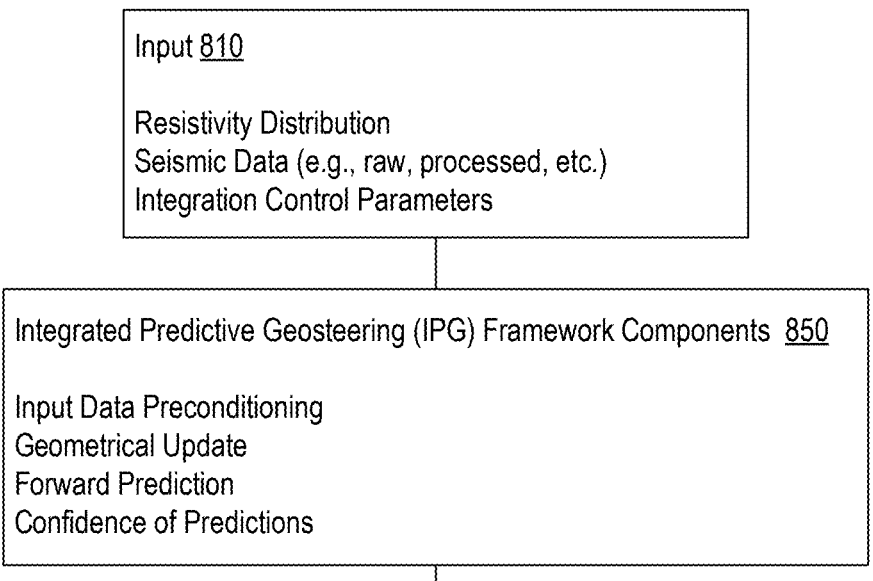

Input 810

Resistivity Distribution
Seismic Data (e.g., raw, processed, etc.)
Integration Control Parameters Integrated Predictive Geosteering (IPG) Framework Components  850

Input Data Preconditioning
Geometrical Update
Forward Prediction
Confidence of Predictions Output  880

Updated Position of Seismic Data, etc.
Extrapolated Property Distribution to Positions Ahead of Drill Bit
Geometrical Objects Quantifying/Displaying Uncertainty of Prediction
Spatial Distribution of Reservoir Property Quantifying and/or displaying Uncertainty of Prediction
Other

801

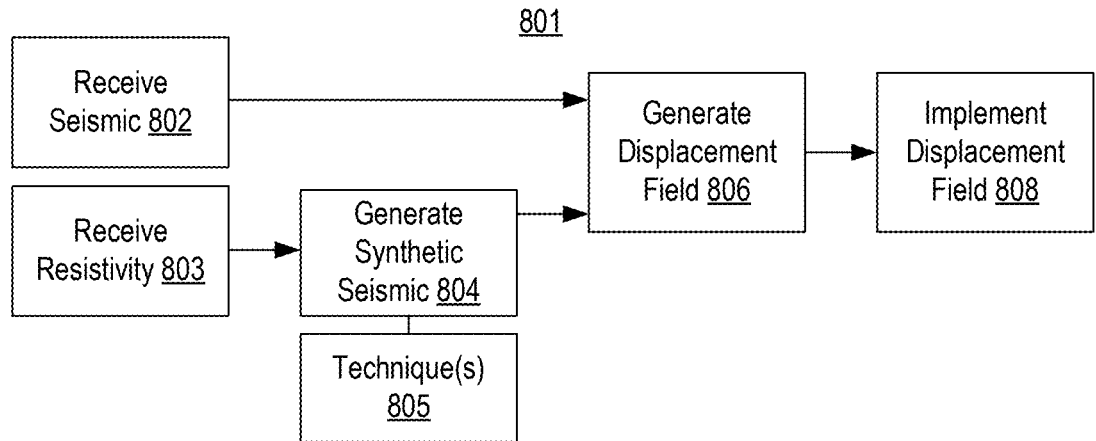

Receive Seismic 802

Receive Resistivity 803

Generate Synthetic Seismic 804

Technique(s) 805

Generate Displacement Field 806

Implement Displacement Field 808

Offset Well Y

1200

Offset Well X

Borehole Being Drilled

Method <u>1600</u>

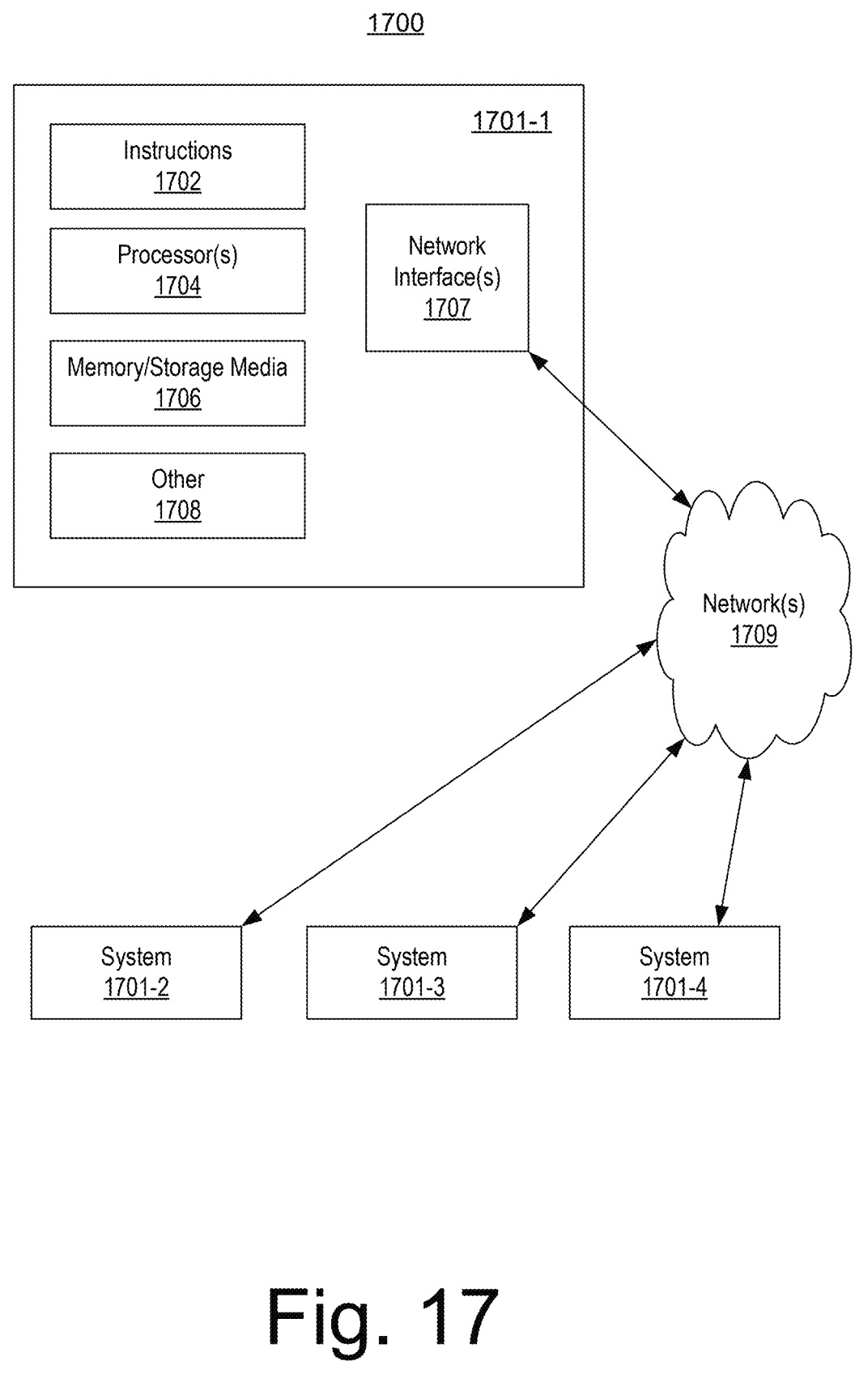

1700

1701-1

Instructions
1702

Processor(s)
1704

Memory/Storage Media
1706

Other
1708

Network
Interface(s)
1707

Network(s)
1709

System
1701-2

System
1701-3

System
1701-4

Fig. 17

GEOSTEERING CONTROL FRAMEWORK

BACKGROUND

Geosteering may provide for directional control of a drill bit of a drillstring using downhole logging while-drilling measurements, for example, to keep a directional wellbore within a pay zone. In various scenarios, geosteering may be used to keep a wellbore in a particular section of a reservoir to minimize gas or water breakthrough and maximize hydrocarbon production.

SUMMARY

A method can include receiving resistivity data acquired by a downhole tool of a drillstring disposed at least in part in a borehole in a subsurface environment, where the borehole includes a downhole end, and where the borehole defines a borehole axis; generating synthetic resistivity data for a region of the subsurface environment beyond the downhole end of the borehole, where the generating synthetic resistivity includes using at least a portion of the resistivity data; receiving seismic data for the subsurface environment, where the seismic data include spatial locations; inverting at least a portion of the resistivity data, at least a portion of the synthetic resistivity data, and at least a portion of the seismic data to estimate values for a number of physical properties of a portion of the subsurface environment that includes at least a portion of the region of the subsurface environment beyond the downhole end of the borehole; and controlling the drillstring using at least a portion of the values. A system can include a processor; memory accessible to the processor; and processor-executable instructions stored in the memory and executable by the processor to instruct the system to: receive resistivity data acquired by a downhole tool of a drillstring disposed at least in part in a borehole in a subsurface environment, where the borehole includes a downhole end, and where the borehole defines a borehole axis; generate synthetic resistivity data for a region of the subsurface environment beyond the downhole end of the borehole, where the generating synthetic resistivity includes using at least a portion of the resistivity data; receive seismic data for the subsurface environment, where the seismic data include spatial locations; invert at least a portion of the resistivity data, at least a portion of the synthetic resistivity data, and at least a portion of the seismic data to estimate values for a number of physical properties of a portion of the subsurface environment that includes at least a portion of the region of the subsurface environment beyond the downhole end of the borehole; and control the drillstring using at least a portion of the values. One or more non-transitory computer-readable storage media can include processor-executable instructions executable to instruct a processor to: receive resistivity data acquired by a downhole tool of a drillstring disposed at least in part in a borehole in a subsurface environment, where the borehole includes a downhole end, and where the borehole defines a borehole axis; generate synthetic resistivity data for a region of the subsurface environment beyond the downhole end of the borehole, where the generating synthetic resistivity includes using at least a portion of the resistivity data; receive seismic data for the subsurface environment, where the seismic data include spatial locations; invert at least a portion of the resistivity data, at least a portion of the synthetic resistivity data, and at least a portion of the seismic data to estimate values for a number of physical properties of a portion of the subsurface environment that includes at least a portion of the region of the subsurface environment beyond the downhole end of the borehole; and control the drillstring using at least a portion of the values. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations may be more readily understood by reference to the following description taken in conjunction with the accompanying drawings.

FIG. 8 illustrates an example of a system and an example of a method;

FIG. 17 illustrates examples of computing and networking equipment.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, geosteering may provide information for directional control of a drill bit of a drillstring using downhole logging while-drilling measurements, for example, to keep a directional wellbore within a pay zone where, in various scenarios, geosteering may be used to keep a wellbore in a particular section of a reservoir to minimize gas or water breakthrough and maximize hydrocarbon production.

A borehole may be referred to as a wellbore and may include an openhole portion or an uncased portion and/or may include a cased portion. A borehole may be defined by a bore wall that is composed of rock that bounds the borehole. As to a well or a borehole, whether for one or more of exploration, sensing, production, injection or other operation(s), it may be planned. Such a process may be referred to generally as well planning, a process by which a path may be mapped in a geologic environment. Such a path may be referred to as a trajectory, which may include coordinates in a three-dimensional coordinate system where a measure along the trajectory may be a measured depth (MD), a total vertical depth (TVD) or another type of measure.

As an example, drilling may include using one or more logging tools that may perform one or more logging operations while drilling or otherwise with a drillstring (e.g., while stationary, while tripping in, tripping out, etc.). As an example, drilling or one or more other operations may occur responsive to measurements. For example, a logging while drilling operation may acquire measurements and adjust drilling based at least in part on such measurements. In such an example, adjustments may be made by actuating one or more geosteering actuators that may provide for orienting a drill bit of a drillstring.

Figure 1:
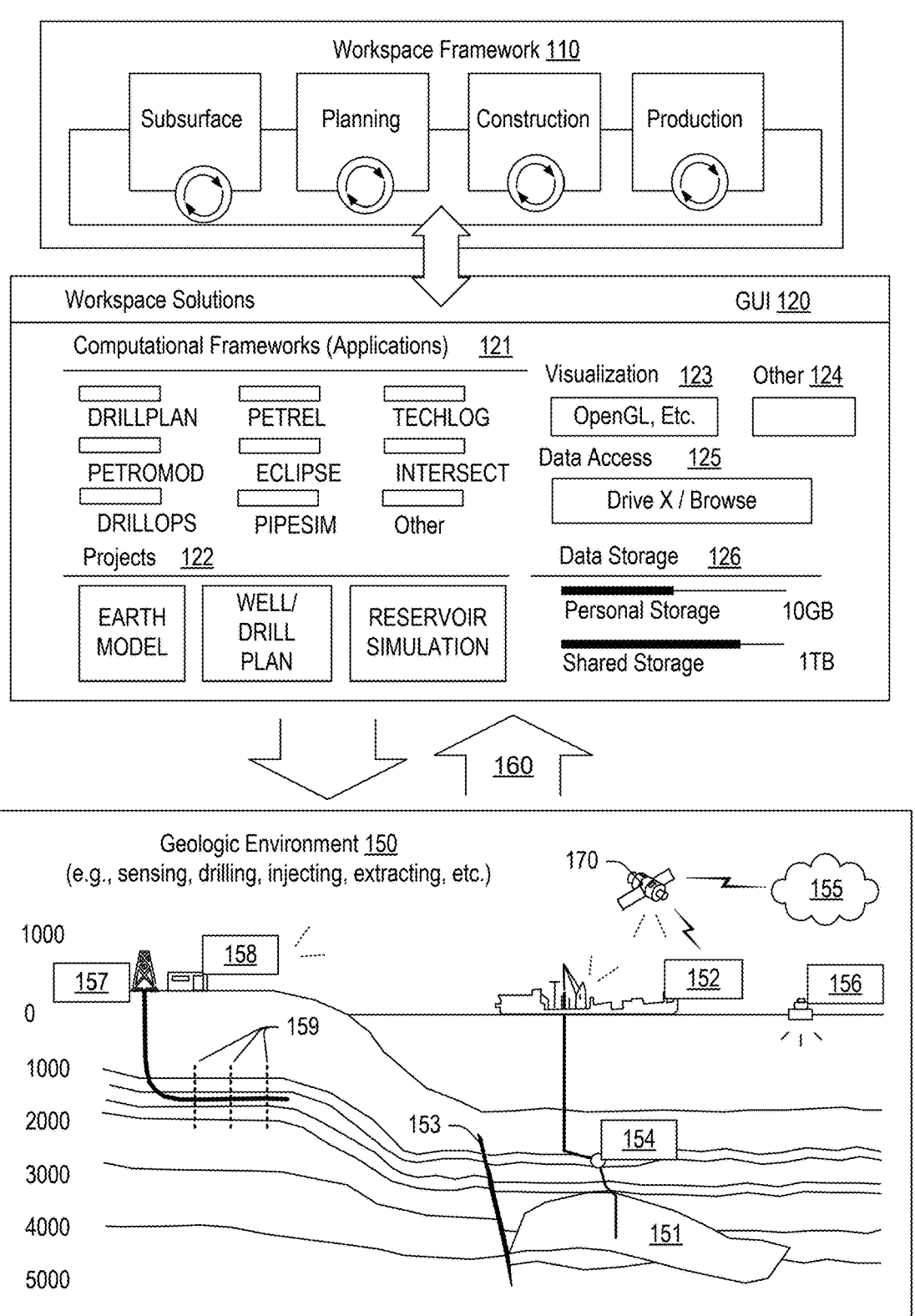
FIG. 1 illustrates examples of equipment in a geologic environment.

FIG. 1 shows an example of a system 100 that includes a workspace framework 110 that may provide for instantiation of, rendering of, interactions with, etc., a graphical user interface (GUI) 120. In the example of FIG. 1, the GUI 120 may include graphical controls for computational frameworks (e.g., applications, etc.) 121, projects 122, visualization features 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite 170 in communication with the network 155 that may be configured for communications, noting that the satellite 170 may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, DRILLOPS, PETREL, TECHLOG, PETRO-MOD, ECLIPSE, PIPESIM, and INTERSECT frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The DRILLOPS framework may execute a digital drilling plan and ensure plan adherence, while delivering goal-based automation. The DRILLOPS framework may generate activity plans automatically individual operations, whether they are monitored and/or controlled on the rig or in town. Automation may utilize data analysis and learning systems to assist and optimize tasks, such as, for example, setting ROP to drilling a stand. A preset menu of automatable drilling tasks may be rendered, and, using data analysis and models, a plan may be executed in a manner to achieve a specified goal, where, for example, measurements may be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) may be continually monitored and dynamically updated using feedback from operational activities. The DRILLOPS framework may provide for various levels of automation based on planning and/or re-planning (e.g., via the DRILLPLAN framework), feedback, etc.

The PETREL framework may be part of the DELFI environment for utilization in geosciences and geoengineering, for example, to analyze subsurface data from exploration to production of fluid from a reservoir. The DELFI cognitive exploration and production (E&P) environment (SLB, Houston, Texas), referred to herein as the DELFI environment or DELFI framework, is a secure, cognitive, cloud-based collaborative environment that integrates data and workflows with digital technologies, such as artificial intelligence and machine learning.

The PETREL framework provides components that allow for optimization of various exploration, development and production operations. The PETREL framework includes seismic to simulation software components that may output information for use in increasing reservoir performance, for example, by improving asset team productivity. Through use of such a framework, various professionals (e.g., geophysicists, geologists, and reservoir engineers) may develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

The TECHLOG framework may handle and process field and laboratory data for a variety of geologic environments (e.g., deepwater exploration, shale, etc.). The TECHLOG framework may structure wellbore data for analyses, planning, etc.

The PETROMOD framework provides petroleum systems modeling capabilities that may combine one or more of seismic, well, and geological information to model the evolution of a sedimentary basin. The PETROMOD framework may predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework may produce reliable results, which may be continuously updated by real-time data exchanges (e.g., from one or more types of data acquisition equipment in the field that may acquire data during one or more types of field operations, etc.). The INTERSECT framework may provide completion configurations for complex wells where such configurations may be built in the field, may provide detailed enhanced-oil-recovery (EOR) formulations where such formulations may be implemented in the field, may analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases. For example, a workflow may utilize one or more of the DELFI environment on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 may be utilized for directing, controlling, etc., one or more processes in the geologic environment 150 and, feedback 160, may be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G frameworks (e.g., consider the PETREL framework, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process may implement one or more of various features that may be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. Such an approach may provide for compatibility of devices, frameworks, etc., with respect to one or more sets of instructions.

As an example, visualization features may provide for visualization of various earth models, properties, etc., in one or more dimensions. As an example, visualization features may provide for rendering of information in multiple dimensions, which may optionally include multiple resolution rendering. In such an example, information being rendered may be associated with one or more frameworks and/or one or more data stores. As an example, visualization features may include one or more control features for control of equipment, which may include, for example, field equipment that may perform one or more field operations. As an example, a workflow may utilize one or more frameworks to generate information that may be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results may be utilized to plan, simulate, perform, etc., one or more operations for production of fluid from a reservoir (e.g., reservoir rock, etc.).

As an example, a model may be a simulated version of a geologic environment. As an example, a simulator may include features for simulating physical phenomena in a geologic environment based at least in part on a model or models. A simulator, such as a reservoir simulator, may simulate fluid flow in a geologic environment based at least in part on a model that may be generated via a framework that receives seismic data. A simulator may be a computerized system (e.g., a computing system) that may execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that may be based on interpretation of seismic and/or other data. A spatial model may be a cell-based model where cells are defined by a grid (e.g., a mesh). A cell in a cell-based model may represent a physical area or volume in a geologic environment where the cell may be assigned physical properties (e.g., permeability, fluid properties, etc.) that may be germane to one or more physical phenomena (e.g., fluid volume, fluid flow, pressure, etc.). A reservoir simulation model may be a spatial model that may be cell-based.

While several simulators are illustrated in the example of FIG. 1, one or more other simulators may be utilized, additionally or alternatively. For example, consider the VISAGE geomechanics simulator (SLB, Houston Texas), the PIPESIM network simulator (SLB, Houston Texas), etc. As an example, the KINETIX framework (SLB Houston, Texas) may be utilized for reservoir-centric stimulation-to-production workflows that may integrate geology, petrophysics, completion engineering, reservoir engineering, and geomechanics to assist in optimization of completion and fracturing designs for a well, a pad, or a field, etc. From 1D logs and simple geometric completions to full 3D mechanical and petrophysical models coupled with the INTERSECT simulator and the VISAGE geomechanics simulator, the KINETIX framework provides various options, including automated parallel processing (e.g., consider cloud platform computing, etc.).

As an example, a workflow may utilize one or more types of data for one or more processes (e.g., stratigraphic modeling, basin modeling, completion designs, drilling, production, injection, etc.). As an example, one or more tools may provide data that may be used in a workflow or workflows that may implement one or more frameworks (e.g., PETREL, TECHLOG, PETROMOD, ECLIPSE, etc.).

In the example of FIG. 1, drilling may be performed in the geologic environment 150, for example, to access the reservoir 151, which may be accessed from land or offshore. In FIG. 1, the downhole equipment 154 may be, for example, part of a bottom hole assembly (BHA). The BHA may be used to drill a well. The downhole equipment 154 may communicate information to equipment at the surface, and may receive instructions and information from the equipment at the surface. During a well construction process, a variety of operations (such as cementing, wireline evaluation, testing, etc.) may be conducted. In such embodiments, data collected by tools and sensors and used for reasons such as reservoir characterization may be collected and transmitted.

As an example, a well may include a substantially horizontal portion (e.g., lateral portion) that may intersect with one or more fractures. For example, a well in a shale formation may pass through natural fractures, artificial fractures (e.g., hydraulic fractures), or a combination thereof. Such a well may be constructed using directional drilling techniques as described herein. However, these same techniques may be used in connection with other types of directional wells (such as slant wells, S-shaped wells, deep inclined wells, and others) and are not limited to horizontal wells.

As an example, a platform, such as, for example, the LUMI platform (SLB, Houston, Texas) may be utilized. The LUMI platform includes features that provide for artificial intelligence solutions as may be integrated with data management capabilities. The LUMI platform provides for flexible deployment options and an open, secure, and modular architecture, for example, to empower data-driven decision-making. The LUMI platform is operable with the DELFI environment and, hence, one or more of various frameworks. While various platforms, environments, frameworks, libraries, etc., are mentioned, a framework may be operable in an agnostic manner, for example, to be compatible with one or more other platforms, environments, frameworks, libraries, technologies, etc.

Figure 2:
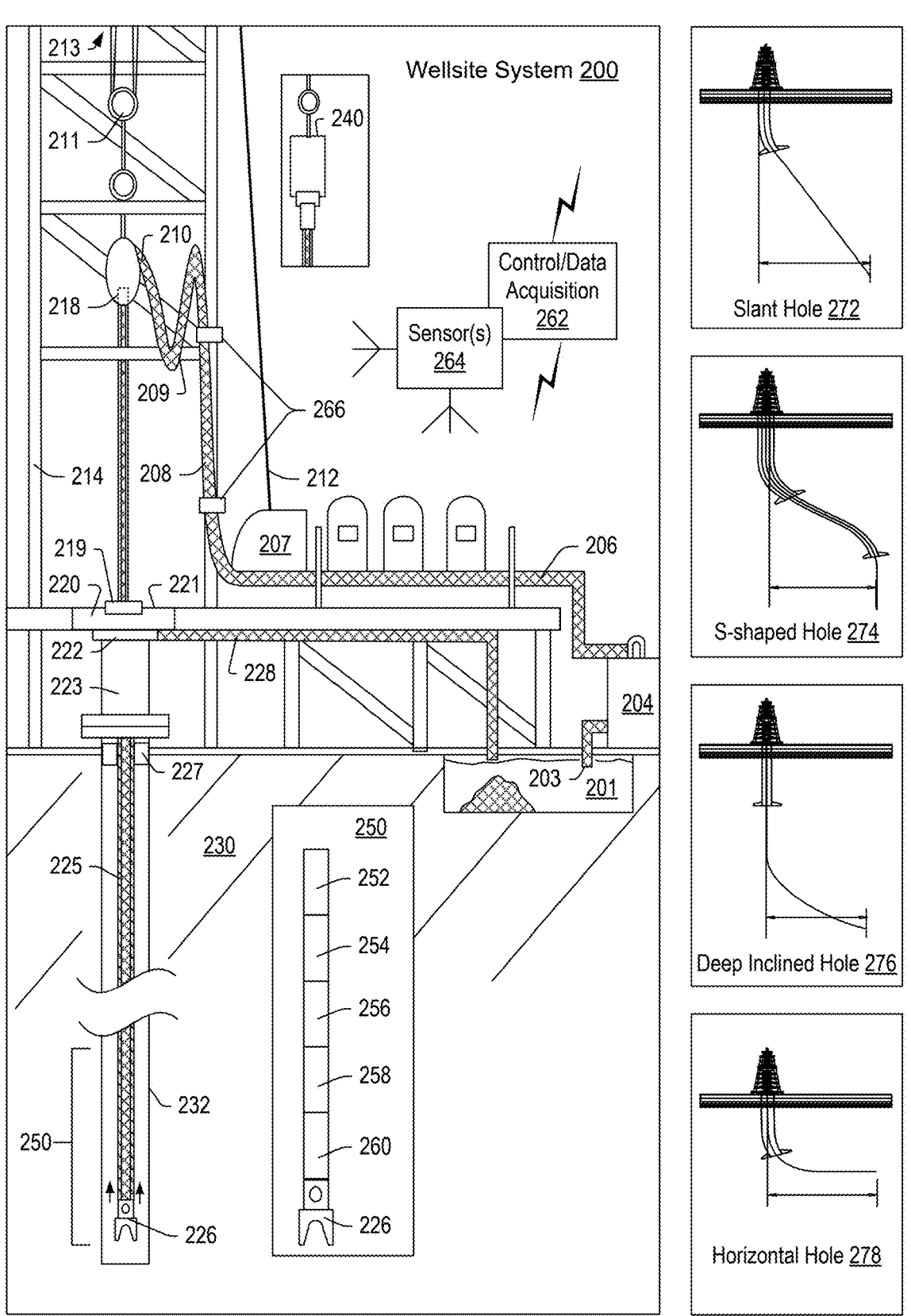
FIG. 2 illustrates an example of a system and examples of types of holes.

FIG. 2 shows an example of a wellsite system 200 (e.g., at a wellsite that may be onshore or offshore). As shown, the wellsite system 200 may include a mud tank 201 for holding mud and other material (e.g., where mud may be a drilling fluid that may help to transport cuttings, etc.), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212, a derrick 214, a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling or one or more other types of drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 may provide for operation of the drillstring 225 and other operations. As shown, the wellsite system 200 includes the platform 215 and the derrick 214 positioned over the borehole 232. As mentioned, the wellsite system 200 may include the rotary table 220 where the drillstring 225 passes through an opening in the rotary table 220.

As shown in the example of FIG. 2, the wellsite system 200 may include the kelly 218 and associated components, etc., or a top drive 240 and associated components. As to a kelly example, the kelly 218 may be a square or hexagonal metal/alloy bar with a hole drilled therein that serves as a mud flow path. The kelly 218 may be used to transmit rotary motion from the rotary table 220 via the kelly drive bushing 219 to the drillstring 225, while allowing the drillstring 225 to be lowered or raised during rotation. The kelly 218 may pass through the kelly drive bushing 219, which may be driven by the rotary table 220. As an example, the rotary table 220 may include a master bushing that operatively couples to the kelly drive bushing 219 such that rotation of the rotary table 220 may turn the kelly drive bushing 219 and hence the kelly 218. The kelly drive bushing 219 may include an inside profile matching an outside profile (e.g., square, hexagonal, etc.) of the kelly 218; however, with slightly larger dimensions so that the kelly 218 may freely move up and down inside the kelly drive bushing 219.

As to a top drive example, the top drive 240 may provide functions performed by a kelly and a rotary table. The top drive 240 may turn the drillstring 225. As an example, the top drive 240 may include one or more motors (e.g., electric and/or hydraulic) connected with appropriate gearing to a short section of pipe called a quill, that in turn may be screwed into a saver sub or the drillstring 225 itself. The top drive 240 may be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 may hold mud, which may be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud may then flow via a passage (e.g., or passages) in the drillstring 225 and out of ports located on the drill bit 226 (see, e.g., a directional arrow). As the mud exits the drillstring 225 via ports in the drill bit 226, it may then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud may be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more components of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud may cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring may include a plurality of tools.

As to an RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling may commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; noting that a mud motor may present some challenges depending on factors such as rate of penetration (ROP), transferring weight to a bit (e.g., weight on bit, WOB) due to friction, etc. A mud motor may be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM may operate in a so-called sliding mode, when the drillstring is not rotated from the surface; noting that a top drive may oscillate the drillstring to reduce friction (e.g., turning clockwise and counterclockwise) during slide drilling.

An RSS may drill directionally where there is continuous rotation from surface equipment, which may alleviate the sliding of a steerable motor (e.g., a PDM). An RSS may be deployed when drilling directionally (e.g., deviated, horizontal, or extended-reach wells). An RSS may aim to minimize interaction with a borehole wall, which may help to preserve borehole quality. An RSS may aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and may contain one or a plurality of selected types of logging tools (e.g., NMR unit or units, etc.). It will also be understood that one or more LWD and/or MWD modules may be employed at one or more positions. An LWD module may include capabilities for measuring, processing, and storing information, as well as for communicating with the surface equipment. In the illustrated example, the LWD module 254 may include a seismic measuring device (e.g., sonic, etc.), an NMR measuring device, a resistivity measuring device, etc.

The MWD module 256 may be housed in a suitable type of drill collar and may contain one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller may generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

As an example, one or more measuring devices may be included in a drillstring (e.g., a BHA, etc.) where, for example, measurements may support one or more of geosteering, geostopping, trajectory optimization, etc.

FIG. 2 also shows some examples of types of holes that may be drilled. For example, consider a slant hole 272, an S-shaped hole 274, a deep inclined hole 276 and a horizontal hole 278. In various instances, a borehole may be referred to as a high-angle (HA) borehole or a horizontal (HZ) borehole. An HA borehole may be defined as having a section at an angle deviating from vertical, for example, consider an angle greater than 45 degrees, which may exceed 60 degrees and may approach 90 degrees; noting that an HZ borehole may also be defined as having a section at an angle deviating from vertical, for example, consider an angle more than approximately 80 degrees.

As an example, a drilling operation may include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees. As an example, a trajectory and/or a drillstring may be characterized in part by a dogleg severity (DLS), which may be a two-dimensional parameter specified in degrees per 30 meters (e.g., or degrees per 100 feet).

As an example, a directional well may include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, consider a drillstring that may include a positive displacement motor (PDM).

As an example, a system may be a steerable system and include equipment to perform a method such as geosteering. As mentioned, a steerable system may be or include an RSS. As an example, a steerable system may include a PDM and/or a turbine on a lower part of a drillstring which, just above a drill bit, a bent sub may be mounted. Geosteering equipment of a drillstring may include one or more geosteering actuators that may provide for orienting a drill bit of the drillstring. For example, an actuator that may include a piston that moves a pad for providing a force that may be exerted against a borehole wall thus steering a bottom hole assembly (e.g., orienting a drill bit of the bottom hole assembly). As an example, an actuator may be a bent downhole motor, which may be actuated via one or more processes. As an example, a bent drilling motor may be used with a fixed bend that cannot be varied during normal operation or with a variable bend that, for example, may be varied based on a geosteering command. As an example, for a variable bend drilling motor, one or more actuators may be included that may be configured to create or vary a bend, thereby affecting the steering behavior of the steering system. As an example, an actuator may be a downhole actuator that may adjust orientation downhole and/or an actuator may be a surface actuator that may perform an action uphole (e.g., at surface) to adjust orientation downhole.

As an example, above a PDM and/or other directional drilling equipment, MWD equipment that provides real time or near real time data of interest (e.g., inclination, direction, pressure, temperature, real weight on the drill bit, torque stress, etc.) and/or LWD equipment may be installed. As to the latter, LWD equipment may make it possible to acquire for sending to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, may allow for implementing a geosteering method. Such a method may include navigating a subsurface environment, for example, to follow a desired route to reach a desired target or targets.

As an example, a drillstring may include one or more of an azimuthal density neutron (ADN) tool for measuring density and porosity; a MWD tool for measuring inclination, azimuth and shocks; a compensated dual resistivity (CDR) tool for measuring resistivity and gamma ray related phenomena; a combinable magnetic resonance (CMR) tool for measuring properties (e.g., relaxation properties, etc.); one or more variable gauge stabilizers; one or more bend joints; and a geosteering tool, which may include a motor and optionally equipment for measuring and/or responding to one or more of inclination, resistivity and gamma ray related phenomena.

As an example, a tool such as the ECOSCOPE tool (SLB, Houston, Texas) may be utilized to acquire measurements. Such a tool may include one or more pulsed neutron generators (PNGs) and associated detectors. Such a tool may include features for one or more of resistivity, neutron porosity, azimuthal gamma ray, density, elemental capture spectroscopy and sigma measurements. For example, consider features for one or more of 2 MHz and 400 kHz propagation resistivity, elemental capture spectroscopy, neutron-gamma density, capture cross section (sigma), azimuthal bulk density, azimuthal photoelectric factor, azimuthal natural gamma ray, density caliper, ultrasonic caliper, annular pressure and temperature while drilling, triaxial shocks and vibration, and near-bit borehole inclination. Such a tool may be operatively coupled to one or more telemetry systems that may provide for real-time acquisition and, for example, real-time decision making, rendering of graphics, etc. As an example, such a tool may be operatively coupled to one or more types of circuitries, which may, for example, perform computations downhole using measurements acquired downhole.

As an example, a tool such as the PERISCOPE tool (SLB, Houston, Texas) may be utilized to acquire measurements. For example, consider measurements such as resistivity, which may be acquired using one or more types of receivers. As an example, a receiver may be or include an antenna. For example, the PERISCOPE tool may include tilted, axial, and transverse antenna. As an example, data acquired from such a tool may provide for identification of layers, number of layers, position of a layer or layers, within a distance of 1 meter or more (e.g., up to or more than 8 meters).

As to sigma measurements (e.g., sigma data), sigma is the macroscopic cross section for the absorption of thermal neutrons, or capture cross section, of a volume of matter, measured in capture units (c.u.). A sigma log is the principal output of a pulsed neutron capture log, which may be used for one or more purposes.

As an example, one or more types of nuclear measurements may be acquired by one or more tools where such nuclear measurements may include one or more of electron density ($\rho_e$), hydrogen index (HI), and thermal neutron capture cross section (sigma or $\Sigma$).

As an example, geosteering may include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 may include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 may be provided for tracking pipe, tracking movement of at least a portion of a drillstring, etc.

As an example, the system 200 may include one or more sensors 266 that may sense and/or transmit signals to a fluid conduit such as a drilling fluid conduit (e.g., a drilling mud conduit). For example, in the system 200, the one or more sensors 266 may be operatively coupled to portions of the standpipe 208 through which mud flows. As an example, a downhole tool may generate pulses that may travel through the mud and be sensed by one or more of the one or more sensors 266 (e.g., consider mud-pulse telemetry). In such an example, the downhole tool may include associated circuitry such as, for example, encoding circuitry that may encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 may include a transmitter that may generate signals that may be transmitted downhole via mud (e.g., drilling fluid) as a transmission medium.

Analysis of formation information acquired by one or more tools may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). A reservoir may be a porous formation where fluid may be within various pores of the porous formation and amenable to movement (e.g., to produce fluid from the reservoir). As an example, information acquired by a tool or tools may be analyzed using a framework such as the TECHLOG framework (SLB, Houston, Texas). As an example, the TECHLOG framework may be interoperable with one or more other frameworks such as, for example, the PETREL framework (SLB, Houston, Texas). As an example, a computational environment such as, for example, the DELFI environment (SLB, Houston, Texas) may be utilized, which may provide for utilization of the PETREL framework and other frameworks, optionally in interrelated manners.

Figure 3:
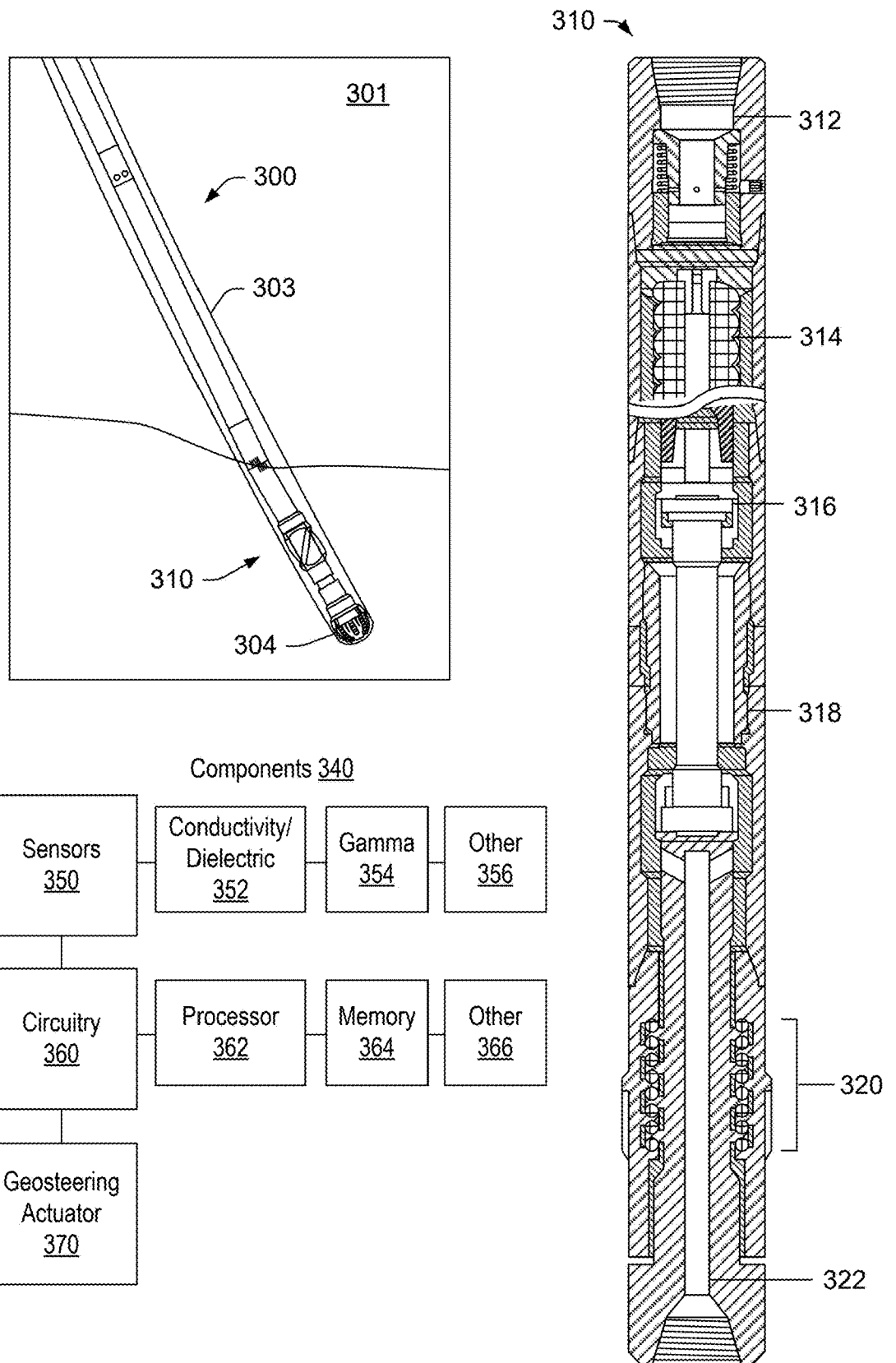
FIG. 3 illustrates an example of a geologic environment with a borehole and an example of a portion of a drillstring that may include various components.

FIG. 3 shows an example of a drilling assembly 300 in a geologic environment 301 that includes a borehole 303 where the drilling assembly 300 (e.g., a drillstring) includes a bit 304 and a motor section 310 where the motor section 310 may drive the bit 304 (e.g., cause the bit 304 to rotate and deepen the borehole 303).

As shown, the motor section 310 may include a dump valve 312, a power section 314, a surface-adjustable bent housing 316, a transmission assembly 318, a bearing section 320 and a drive shaft 322, which may be operatively coupled to a bit such as the bit 304. The motor section 310 of FIG. 3 may be a POWERPAK family motor section (SLB, Houston, Texas) or another type of motor section.

A power section may convert hydraulic energy from drilling fluid into mechanical power to turn a bit. For example, consider the reverse application of the Moineau pump principle. During operation, drilling fluid may be pumped into a power section at a pressure that causes the rotor to rotate within the stator where the rotational force is transmitted through a transmission shaft and drive shaft to a bit.

FIG. 3 also shows examples of components 340 such as, for example, sensors 350, circuitry 360 and a geosteering actuator 370. As shown, the sensors 350 may include a conductivity and dielectric sensor 352, a gamma sensor 354 and one or more other sensors 356. As shown, the circuitry 360 may include a processor 362, memory 364 and one or more other types of circuitries 366. As shown, the geosteering actuator 370 may be operatively coupled to the circuitry 360 and the sensors 350. For example, the circuitry 360 may process signals (e.g., measurements or sensor data) of the sensors 350 to generate one or more commands for actuation of the geosteering actuator 370. In the example of FIG. 3, the geosteering actuator 370 may provide for one or more of PDM actuation and bent sub actuation, for example, to orient the drill bit 304.

Figure 4:
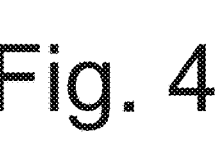
FIG. 4 illustrates an example of a portion of a drillstring that may include various components.

FIG. 4 shows an example of a drilling assembly 400 (e.g., a portion of a drillstring) that includes a bit 404 and a rotary steerable system (RSS) 410. As mentioned, an RSS may be utilized for directional drilling, including geosteering. As an example, the RSS 410 may include one or more features of a POWERDRIVE ARCHER RSS (SLB, Houston, Texas).

FIG. 4 also shows examples of components 440 such as, for example, sensors 450, circuitry 460 and a geosteering actuator 470. As shown, the sensors 450 may include a conductivity and dielectric sensor 452, a gamma sensor 454 and one or more other sensors 456. As shown, the circuitry 460 may include a processor 462, memory 464 and one or more other types of circuitries 466. As shown, the geosteering actuator 470 may be operatively coupled to the circuitry 460 and the sensors 450. For example, the circuitry 460 may process signals (e.g., measurements or sensor data) of the sensors 450 to generate one or more commands for actuation of the geosteering actuator 470. In the example of FIG. 4, the geosteering actuator 470 may provide for RSS actuation, for example, to orient the drill bit 404.

As an example, the drilling assembly 400 may include one or more of a near-bit continuous inclination and azimuth measurement unit or sub, a near-bit azimuthal gamma ray measurement unit or sub, and one or more other types of measurement units or subs.

As an example, a drilling assembly may include one or more types of circuitries. For example, consider a processing unit with a processor and associated memory where one or more sensors may generate signals that may be received by the processing unit. In such an example, the processing unit may perform computations that may utilize information in the signals (e.g., measurements, etc.) to generate commands for geosteering. In such an example, a drilling assembly may be capable of performing, at least in part, downhole geosteering according to geosteering commands generated downhole without transmission of information uphole to a controller and subsequent transmission of information downhole to geosteering equipment. In such an example, at least some types of geosteering processes may be performed more rapidly in response to sensor signals. For example, consider sensor signals indicative of one or more of presence of clay, an amount of clay, a type of clay, and a boundary as an interface between layers, where downhole geosteering equipment may act to steer a drill bit based on one or more of such sensor signals.

As an example, an electromagnetic conductivity measurement tool (ECM tool) may be implemented as a wireline tool and/or implemented as a LWD tool to generate permittivity and conductivity measurements at each frequency for one or more frequencies, which may be interpreted using a petrophysical model. In such an example, output parameters of the model may include water-filled porosity (hence water saturation if the total porosity is known) and water salinity. As an example, parameters that may be output using ECM tool measurements (e.g., induction, propagation, etc.) may include one or more of bulk formation cation exchange capacity (CEC), water saturation ($S_w$), connate water salinity, Archie cementation exponent and Archie saturation exponent.

Figure 5:
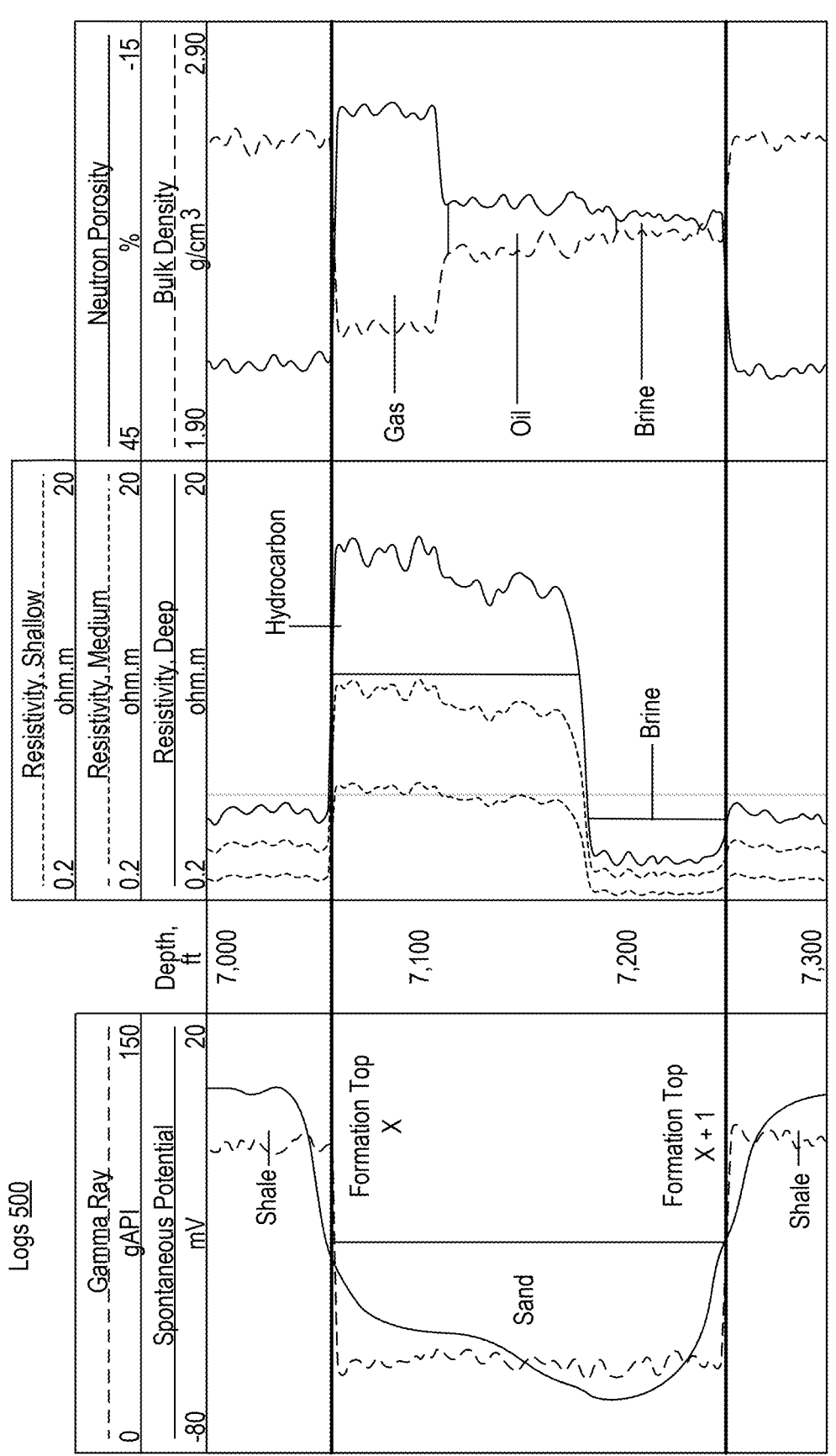
FIG. 5 illustrates examples of logs.

FIG. 5 shows example logs 500 that include various measurements acquired by one or more downhole tools. For example, the logs 500 include spontaneous potential (mV), gamma ray (gAPI), resistivity (ohm·m), neutron porosity (percent), and bulk density (g·cm$^{-3}$). The gamma ray response (track 1) distinguishes the low gamma ray value of sand from the higher value of shale. The spontaneous potential curve generally follows a trend similar to that of the gamma ray. The next column, referred to as a depth track (track 2), indicates the depth at which measurements have been acquired. Across the sandstone formation, the resistivity measurements (track 3) are noticeably higher in the hydrocarbon zone than in the water-saturated zone in the lower part of the sand. Both neutron porosity and bulk density (track 4) provide measures of porosity. Within the hydrocarbon-bearing zone, the separation of the curves varies depending on the type of fluid encountered.

As an example, logs may be acquired as to formation parameters versus depth where, from such logs, lithologies may be identified that may differentiate various type of rock. For example, consider differentiating between porous and nonporous rock, which may provide for identification of one or more pay zones in subsurface formations. In a given field or local geological province, certain formations may have distinctive characteristics that appear similar from one well to the next, providing geologists with a basis for locating the depths of various strata in the subsurface. For example, consider identification of formation tops, which may be tracked from logs of one well to logs of another well. In the example of FIG. 5, the logs 500 include variations with respect to shale and sand where a first interface may be referred to as formation top X and a second interface may be referred to as formation top X+1. In such an example, an interface may be referred to as a boundary, which may also be identifiable in one or more other types of data such as, for example, seismic data. As an example, a workflow may include correlation of seismic picks to geologic picks, such as formation tops interpreted from well logs, to improve model building, etc.

As to types of formation materials, as mentioned, the logs 500, such as the gamma ray data, refer to shale and sand. Shale may be defined as a fine-grained, fissile, detrital sedimentary rock formed by consolidation of clay- and silt-sized particles into thin, relatively impermeable layers. Various clay types and volumes can influence quality of a reservoir from a petrophysical and geomechanical perspective. For example, quality of a shale reservoir may depend on thickness and extent, organic content, thermal maturity, depth and pressure, fluid saturations, and permeability, amongst other factors. As to clay, it may be defined as a fine-grained sediment while sand may be defined to be larger than silt but smaller than a granule according to the Udden-Wentworth scale; noting that sand may also be a term used for quartz grains or for sandstone. As to sandstone, it may be of a relatively high porosity and permeability suitable for forming reservoir rocks. As explained, shale can be formed at least in part by clay and be a clay-rich sedimentary rock. For example, various shales may be composed of approximately 50 percent by weight of clay to approximately 60 percent by weight of clay (e.g., clay minerals). More generally, clay may be utilized as a class of formation material, which may include shale as a subclass.

In 1942, the relationship between resistivity, porosity and water saturation (and thus its inverse: hydrocarbon saturation) was established by G. E. Archie, paving the way for a quantitative evaluation of formation properties using well logs. The Archie equation or relationship may be expressed between the formation factor (F) and porosity (phi) as $F=1/phi^m$, where the porosity exponent, m, is a constant for a particular formation or type of rock, which may be referred to as the Archie cementation exponent (e.g., consider values between 1.8 and 2.0 for consolidated sandstones, and close to 1.3 for loosely consolidated sandstones). While the Archie equation is mentioned, one or more other equations may be utilized, for example, consider one or more of the following types of water saturation equations: Archie, Simandoux, Indonesia, Fertl, and SW ratio, and modifications thereof.

As to resistivity of rock, it is a measure of the degree to which rock may impede the flow of an electric current. As shown, resistivity may be expressed in units of ohm·m, noting that it may be measured in ohm·m$^2$/m. The reciprocal of resistivity is conductivity, which is typically expressed in terms of millimhos or mmhos. The ability to conduct electrical current is a function of the conductivity of water contained in pore space of rock. Pure water does not conduct electricity; whereas, salt ions found in most formation waters do provide for conduction of electricity. Brine-saturated rocks tend to have high conductivity and low resistivity, which may be seen in the resistivity log data of FIG. 5 at depths about 7,200 feet. Hydrocarbons, which are nonconductive, cause resistivity values to increase as the pore spaces within a rock become more saturated with oil or gas.

As to spontaneous potential (SP), it is a measurement of voltage difference between a movable electrode in a wellbore and a fixed electrode at the surface. This electrical potential is primarily generated as a result of exchanges of fluids of different salinities (e.g., salinity of drilling fluid and salinity of formation fluid). During the course of drilling, permeable rock within a wellbore may become invaded by drilling mud filtrate where, if the filtrate is less saline than formation fluid, negatively charged chlorine ions from formation water may cause the SP curve to deflect to the left from an arbitrary baseline established across impermeable shale formations. The magnitude of the deflection is influenced by a number of factors, including permeability, porosity, formation water salinity and mud filtrate properties. Permeable formations filled with water that is fresher than the filtrate will cause the curve to deflect to the right. Hence, by the nature of deflections, an SP log may indicate which formations are permeable. A permeable formation with a high resistivity may be more likely to contain hydrocarbons.

As shown in the logs 500, a gamma ray (GR) log may be included, along with one or more of multiple resistivity logs and porosity readings obtained from density, neutron, and/or sonic logs. As to GR log acquisition, a downhole tool may measure naturally occurring radioactivity from a formation where a GR log may help differentiate non-reservoir rocks (e.g., shales and clays) from reservoir rocks (e.g., sandstone and carbonates). Shales and clays tend to be derived from rocks that tend to contain naturally occurring radioactive elements, primarily potassium, uranium and thorium. As a consequence, shales and clays are more radioactive than clean sandstones and carbonates. Quartz and calcium carbonate produce almost no radiation. A log analysis may look for formations with low background radiation because they may have potential to contain moveable hydrocarbons.

Various resistivity tools may measure a formation at different depths of investigation (e.g., shallow, medium and deep). A resulting log may present shallow, medium and deep tracks. A shallow curve, charting the smallest radius of investigation, may indicate resistivity of a flushed zone surrounding a borehole; a medium curve may indicate resistivity of an invaded zone; and a deepest curve may indicate resistivity of an uncontaminated zone, which may be presumed to be a true formation resistivity; noting that such a curve may still be affected by the presence of mud filtrate. By evaluating separations between curves at different depths of investigation, an analysis may provide an estimation of a diameter of invasion by mud filtrate and may be able to determine which zones are more permeable than others.

As to formation bulk density, it provides a measure of porosity. The bulk density of a formation is based on a ratio of a measured interval's mass to its volume. In general, rock porosity tends to be inversely related to rock density. Formation bulk density may be derived from electron density of a formation. Such a measurement may be obtained by a logging device that emits gamma rays into a formation. Gamma rays may collide with electrons in a formation, giving off energy and scattering in a process known as Compton scattering. The number of such collisions is directly related to the number of electrons in a formation. In low-density formations, more of these scattered gamma rays are able to reach a detector than in formations of higher density.

As hydrogen tends to be a major constituent of both water and hydrocarbons and because water and hydrocarbons concentrate in rock pores, the concentration of hydrogen atoms may be used to determine fluid-filled porosity of a formation. Hydrogen atoms have nearly the same mass as neutrons. Neutron logging tools emit neutrons using a chemical source or an electronic neutron generator. When these neutrons collide with hydrogen atoms in a formation, they lose the maximal energy, slow down and eventually reach a very-low-energy state (e.g., a thermal state). The rate at which neutrons reach the thermal state is proportional to the hydrogen concentration or index (HI). Various neutron porosity tools measure HI, which may be converted to neutron porosity.

As an example, a sonic log may be used to determine porosity by charting the speed of a compressional sound wave as it travels through a formation. Interval transit time (Δt), measured in microseconds per meter or foot and often referred to as slowness, is the reciprocal of velocity. Lithology and porosity affect Δt. Dense, consolidated formations characterized by compaction at depth generally result in a faster (shorter) Δt while fluid-filled porosity results in a slower (longer) Δt. Measurements may be affected by formation and borehole conditions. In various instances, quality control processes may be performed on data. As an example, gas, fractures and lack of compaction may demand adjustments to be applied to a sonic log. Lithologies affect the density, neutron and sonic logs. Invasion of mud filtrate into porous formations affects resistivity readings, and temperature affects the resistivity of both filtrate and saline formation water.

As an example, data from a downhole tool may be transmitted to surface equipment and/or other downhole equipment using one or more types of telemetry technologies. For example, consider mud-pulse telemetry, wire telemetry, fiber telemetry, etc. As an example, data from a downhole tool may be transmitted along with one or more timestamps. As an example, surface equipment may provide for relating a timestamp with a depth, which may be a measured depth. For example, in the logs 500 of FIG. 5, downhole data with timestamps may be transmitted to surface equipment where the surface equipment provides for assigning appropriate depths to the downhole data (see, e.g., depth track as listed in units of feet). As an example, surface equipment may be utilized to transmit depth data downhole where such depth data may be associated with downhole data, utilized to calibrate one or more tools, etc.

As an example, directional drilling may involve drilling a number of different sections such as, for example, a build section, a landing section and a lateral section. In such an example, a build section may be a portion of a directional wellbore curve that may extend from a kick-off point (KOP) to another point. As to a landing section, it may be a portion of a wellbore beyond a build section where steering may be controlled in an effort to hit a target. A landing section may be composed of segments such as, for example, an upper segment, which may be referred to as an approach section, and a lower segment, which may be referred to as a taper section. In the approach section, the magnitude of changes may tend to be greater than in the taper section as the taper section may aim to form a wellbore that smoothly transition at the end of the landing as the drillstring enters a target zone (e.g., a target formation). As to a lateral section, it may be a portion of a wellbore that extends substantially horizontally from an end of a landing taper, out to an end of the wellbore. A course change within a lateral section may affect a reservoir for better or for worse. As an example, a lateral section may be drilled using a BHA, which may include a mud motor, an RSS, etc. In various scenarios, inclination and/or azimuth of a lateral section may be maintained through a combination of sliding and rotating of a drillstring.

As an example, directional drilling may include geosteering as part of a landing job (e.g., drilling a landing section). In a landing job for a well, estimated well tops in the current well may lack accuracy. For example, estimated well tops may be rough estimates based on data from one or more offset wells as may be visually assessed by one or more individuals. As explained, a drillstring may include one or more logging tools to acquire measurements while drilling (e.g., MWD, LWD, etc.). Thus, when a current well is being drilled, real-time log measurements may be acquired. Where such measurements are available, an assessment may involve performing a comparison of a current well's log data and log data from one or more other wells (e.g., log data from one or more offset wells) to generate a more accurate estimate of one or more well tops. Such an assessment may be referred to as log correlation during geosteering. During directional drilling, accurate estimation of well tops may provide for decision making. For example, consider decision making as to whether drilling has arrived one or more points along a trajectory (e.g., planned trajectory points, safety points, etc.). In various instances, a point may be associated with an operation (e.g., a downhole operation, etc.) that is to be performed. During a landing job, a decision may relate to termination of a landing section or a transition from one landing segment to another.

As explained, directional drilling may involve performing log correlation visually, for example, using a number of logs rendered to a display. In such an example, one or more well placement engineers may interact with a graphical user interface that may provide for rendering logs to a display and manually adjusting positions of logs with respect to one another, picking well tops, etc.

As an example, a framework may include one or more components and/or operatively coupled to one or more components for implementing an integrated predictive geosteering workflow. In such an example, components may provide for executing a structural update, a resistivity forward prediction and an uncertainty prediction.

As an example, a framework may include one or more plug-in components. For example, consider one or more framework plug-in components. As an example, a framework may operate in conjunction with one or more plug-ins. For example, a plug-in may instruct an instance of a framework as to performance of one or more of techniques (e.g., import, export, computation, etc.). As an example, a plug-in may provide for launching one or more components within a framework environment, for example, executing using local resources and/or executing using remote resources (e.g., consider one or more of a workstation, a networked HPC cluster, a cloud platform, etc.). As an example of a plug-in for a framework, consider a multi-physics plug-in, which provides tools to integrate electromagnetic (EM) and potential fields data with geological knowledge, seismic data, and well logs. Such a plug-in may include components for magnetotellurics (MT), controlled source EM (CSEM), gravity and magnetics (GM), etc.

As an example, a workflow may be implemented for execution in real-time using at least in part field data. In such an example, components may be coordinated to expedite execution, for example, by reducing number of calls and responses, logistic waiting times, etc. For example, consider a plug-in that may be a unified plug-in for implementation of sub-workflows in an integrated predictive geosteering workflow (IPG workflow). In such an example, the sub-workflows may include a structural update sub-workflow, a resistivity forward prediction sub-workflow and an uncertainty prediction sub-workflow. In such an example, an IPG workflow may be executed using a one-click approach, for example, after setting of inputs, which may be or may include common inputs. As an example, a framework may provide a set of advanced settings for advanced users to investigate more detailed aspects of each sub-workflow and, for example, a dependency management component that may re-run corresponding sub-workflows automatically according to input and/or one or more setting changes. As an example, a framework may include one or more visualization components. For example, consider a component that may provide for implementing a method that creates visualizations of results from a number of sub-workflows, which may provide for improved interpretations.

Figure 6:
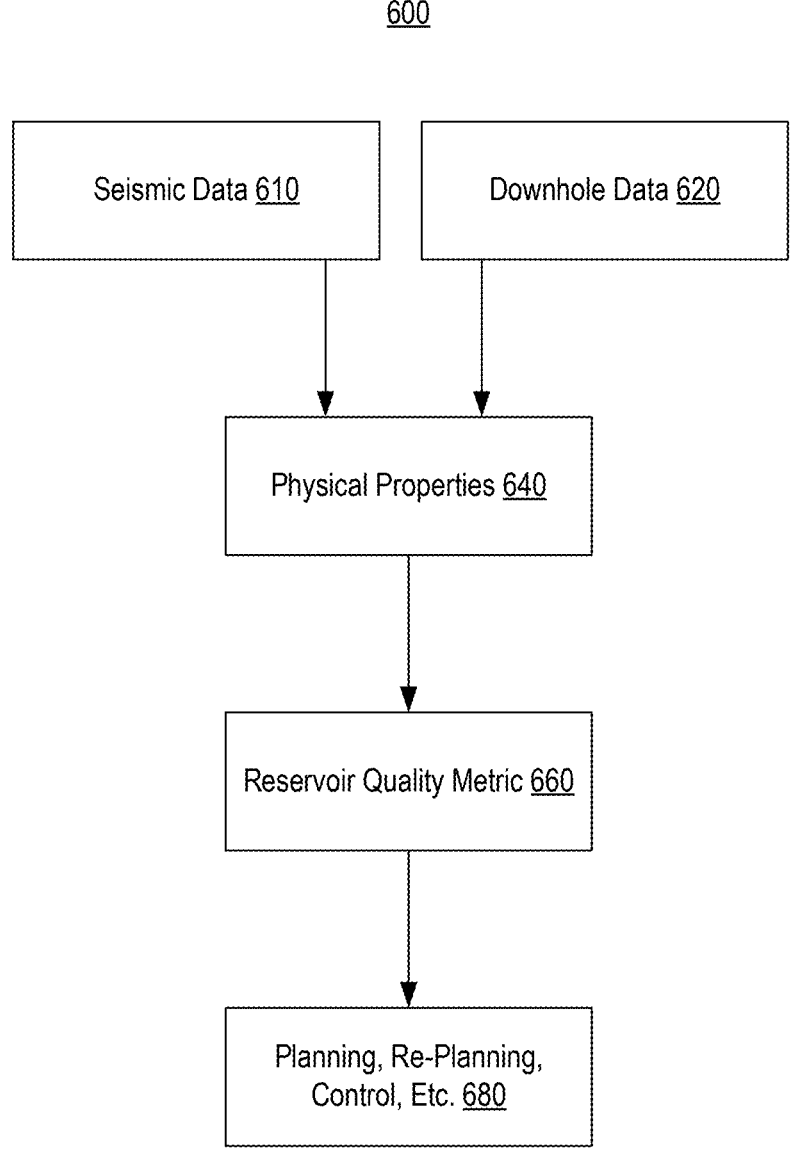
FIG. 6 illustrates an example of a workflow.

FIG. 6 shows an example of a workflow 600 that provides for combining seismic data (e.g., surface seismic data) 610 and downhole data 620 (e.g., data acquired from one or more downhole tools). In such an example, these data may be utilized to determine various physical properties 640. In turn, a reservoir quality metric 660 may be generated using one or more of the various physical properties 640. As shown, the workflow 600 may include performing one or more additional actions 680, such as, for example, consider planning, re-planning, control, etc.

As to acquisition of seismic data, consider a seismic survey that utilizes one or more sources and one or more receivers where a source emits energy that travels into a subsurface region and a receiver that receives a portion of that energy as reflected by one or more subsurface structures in the subsurface region.

As an example, a seismic survey may utilize seismic waves. For example, seismic waves may be defined as periodic vibrational disturbances in which energy is propagated through or on one or more surfaces of one or more media without translation of the material. As an example, seismic waves may be differentiated by their frequency, amplitude, wavelength and speed of propagation. For example, consider seismic waves as waves of elastic energy, such as, for example, elastic energy transmitted by P-waves and S-waves, which may generally be in a frequency range of approximately 1 Hz to approximately 100 Hz. Seismic energy may be processed to characterize a subsurface region, for example, as to composition, fluid content, extent and geometry of rocks. As to utilization of sonic sound waves, such as, for example, of a downhole sonic tool, frequencies may be in a generally higher range (e.g., consider frequencies from approximately 1 kHz to 25 kHz or more).

As to acoustic impedance (Z) as a physical property, it may be computed as the product of density and seismic velocity, which varies among different rock layers. The difference in acoustic impedance between rock layers affects the reflection coefficient. For example, just as an impedance mismatch affects reflection and transmission in electronics, an acoustic impedance mismatch affects reflection and transmission in subsurface environments.

As an example, types of petrophysical properties that may control the value of acoustic impedance in individual rock layers can include (i) elastic properties of a rock matrix and (ii) properties of fluid in pore spaces of rock. For example, P-waves may travel through elastic materials and fluids; thus, a change in either a rock matrix (e.g., consider a change in mineralogy or porosity) or in type of fluid occupying pore spaces may create a discontinuity in P-wave seismic impedance of a subsurface environment. Thus, acoustic impedance, as may be determined through utilization of seismic data, may provide indications as to rock matrix characteristics (e.g., mineralogy, porosity, etc.) and indications as to fluid characteristics in pore spaces of a rock matrix.

In the example of FIG. 6, the downhole data 620 may include LWD tool data that may be acquired and utilized in combination with the seismic data 610. As explained, an LWD tool may provide for acquisition of resistivity measurements of a subsurface region. For example, consider resistivity measurements that are acquired from an LWD tool located on a drillstring at a location uphole from a drill bit where such measurements may be transmitted uphole, optionally in real-time (e.g., via wire, mud-pulse telemetry, etc.). As explained, geosteering may utilize such measurements to control steering of a drill bit, particularly for a lateral (e.g., horizontal) portion of a borehole where an aim may be to keep the drill bit within a generally lateral reservoir layer.

As an example, before drilling a high-angle or horizontal borehole, potential hydrocarbon-bearing zones may be identified, for example, using one or more offset wells, using one or more vertical exploration wells, etc. In such an example, the high-angle or horizontal borehole may be drilled toward a target bed, for example, with marker beds used to maintain the borehole trajectory. In such an example, LWD resistivity logs acquired using an LWD tool located behind a drill bit may be compared to logs from one or more other wells (e.g., offset, exploration, etc.) to identify marker beds. As an example, computer modeling of predicted resistivity-tool response at different borehole deviation angles may be used to modify a borehole trajectory in real-time (e.g., to perform geosteering).

In various instances, an exploration well may be substantially vertical such that upon drilling of a horizontal portion of a borehole, a task involves comparing horizontal resistivity logs to vertical resistivity logs in a common zone. However, differences can exist due to anisotropy (e.g., variation of resistivity with respect to direction). In addition to particle-size anisotropy, formations that include a series of thin beds of different lithology (e.g., such as sequences of sand and shales) may also behave anisotropically if a logging tool is substantially longer than a bed thickness. In vertical wells, resistivity tools measure effective horizontal resistivity, Rh, which may be computed from a volume average of layer conductivities (e.g., inverse resistivities), where conductivities may be expressed in mS/m. As an example, Vsand (e.g., $V_{SD}$) and Vclay (e.g., $V_{CL}$) may be bulk volume fractions (percentages) distributed throughout a layered region. As an example, effective vertical resistivity, Rv, may be computed in a similar manner from the volume average of the layer resistivities.

As to non-vertical boreholes (e.g., a deviated portion), apparent resistivity Ra in anisotropic media may be computed using an approximation that includes a value for an angle between a tool axis and a vertical direction. As to scenarios when the value for the angle is approximately 90 degrees, a non-vertical borehole may be considered to be substantially horizontal. As may be appreciated, vertical resistivity may be undetectable using various resistivity logging tools in a vertical portion of a borehole.

As explained, geosteering based on resistivity measurements from vertical exploration wells and real-time resistivity measurements from a high-angle portion of a borehole being drilled may present challenges, particularly where anisotropy exists.

Further, even where seismic data are utilized in combination with LWD data, challenges can exist. For example, properties, whether rock matrix or fluid, may be somewhat inaccurate at times such that decisions as to a borehole trajectory may be inherently uncertain (e.g., at a level that may impact drilling of a borehole). For example, actual porosity may be 10 percent, while estimated porosity may be 12 percent or 20 percent. As porosity may be an indicator of what is reservoir rock, an erroneous estimated porosity may result in planning a borehole trajectory or steering a drillstring drilling a borehole in a direction that may not necessarily be an optimal direction (e.g., a direction that acts to increase or optimize reservoir contact). As an example, the reservoir quality metric 660 may be generated in a manner that acts to reduce risks associated with reliance on individual physical properties, such as, for example, reliance on porosity values alone.

As an example, a framework may provide for utilization of deep directional electromagnetic (EM) measurements acquired while drilling, which may provide highly resolved, reservoir-scale, images with radial depths of investigation (DOI) in excess of 30 m, which may respond to the true 3D nature of the inhomogeneous electrical resistivity distribution around a borehole. As explained, a workflow, such as, for example, the workflow 600 of FIG. 6 may provide for implementing a while-drilling, real-time process that integrates deep EM resistivity data and available seismic data. In such an example, the seismic data may be provided as acoustic impedance, which may be interpreted jointly with deep EM resistivity data to provide added information specifically on reservoir petrophysical properties around a borehole being drilled and also in front of a drill bit utilized for drilling that lengthens the borehole.

As an example, a framework may provide for addressing one or more reservoir characterization objectives, for example, consider objectives to estimate petrophysical properties of prospective hydrocarbon traps and to reduce uncertainty of interpretation. In such an example, the framework may provide for implementing a workflow for petrophysical joint inversion of seismic and EM attributes to estimate a petrophysical model, for example, in terms of porosity and water saturation. As explained, a workflow may involve joint inversion within a probabilistic structure provided by a Bayesian approach. As an example, a framework may be applied to a real hydrocarbon exploration scenario to evaluate its contribution to an interpretation phase. As an example, 3D volumes of estimated porosity and saturation may be generated via joint inversion of acoustic impedance and electrical resistivity, which may provide a quantitative description of reservoir properties along with a measure of uncertainty, which may be consistent with a petrophysical model and observations.

As an example, a reservoir quality metric may be generated using estimations of a number of physical properties. For example, consider a reservoir quality metric that may be generating using multidimension estimates of porosity and multidimensional estimates of saturation (e.g., water saturation, etc.). As explained, a reservoir quality metric may be a single metric that may be generated for a multidimensional region to thereby facilitate geosteering of a drillstring to form a borehole, lengthen a borehole, drill a branch of a borehole, etc.

As explained, an operator or company performing operations may want to perform reservoir characterization while drilling. Reservoir characterization while drilling may be considered a multiscale, multi-physics, subsurface integration problem. Workflows integrating seismic datasets together with logging while drilling (LWD) very deep directional resistivity measurements may help to enhance structural interpretation of a reservoir's strata, for example, as may be observed around a high-angle portion of a borehole being drilled as well as in front of a drill bit.

While deep directional electromagnetic (EM) measurements acquired while drilling may provide highly resolved, reservoir-scale, images with radial depths of investigation (DOI) in excess of 30 meters, resolving power of very deep directional resistivity tools ahead of a drill bit tends to be limited due to decreasing measurement sensitivity associated with the diffusive nature of EM fields induced in a formation. In various instances, inferring geo-electric structure ahead of a drill bit from EM LWD measurements alone can be rather challenging.

As explained, seismic data and downhole data may be combined, for example, to improve ahead of the bit predicting capabilities that enable integrated interpretation of the resistivity distribution obtained from deep directional EM measurements together with surface seismic data. In various instances, enhanced seismic data interpretation at reservoir-scale may yield a more focused description of structures expected around a borehole trajectory as well as ahead of a drill bit, albeit with lower resolution associated with processing a seismic dataset. In contrast, deep directional EM measurements can be used to determine the geo-electric structure, effectively around a borehole with sub-meter scale lateral sensitivity and thereby high resolution of resulting images when compared to surface seismic data.

As an example, integration of LWD measurements and surface seismic may provide for improving reservoir petrophysical property estimates, such as, for example, one or more of porosity, fluid saturation, volume of clay, etc. As explained, in a while-drilling, real-time process, integration of inversion for reservoir properties with seismic data may provide added information around a borehole being drilled and also in front of a drill bit. As an example, in a static setting, where data are already available, integration of reservoir properties may yield a global update of a 3D model incorporating datasets from multiple wells.

As an example, a workflow for integrating surface seismic and electromagnetic data may be utilized to obtain 3D volumes of reservoir property distributions, for example, via linking well log measurements, surface and seafloor marine remote sensing (e.g. controlled source electromagnetic), etc. As explained, a workflow may provide for integrating seismic data and LWD deep directional resistivity measurements where such seismic data may include one or more of surface seismic data and borehole seismic data.

As an example, in the workflow 600 of FIG. 6, a joint inversion of seismic data and LWD deep directional resistivity measurements may be performed for determining of one or more of the physical properties 640. For example, consider a joint inversion (e.g., simultaneous, etc.) that may be performed to characterize various reservoir physical properties (e.g., porosity, fluid saturation, etc.) in a while-drilling scenario. In such an approach, output may include enhanced characterization of a reservoir, around a borehole and in front of a drill bit.

Figure 7:
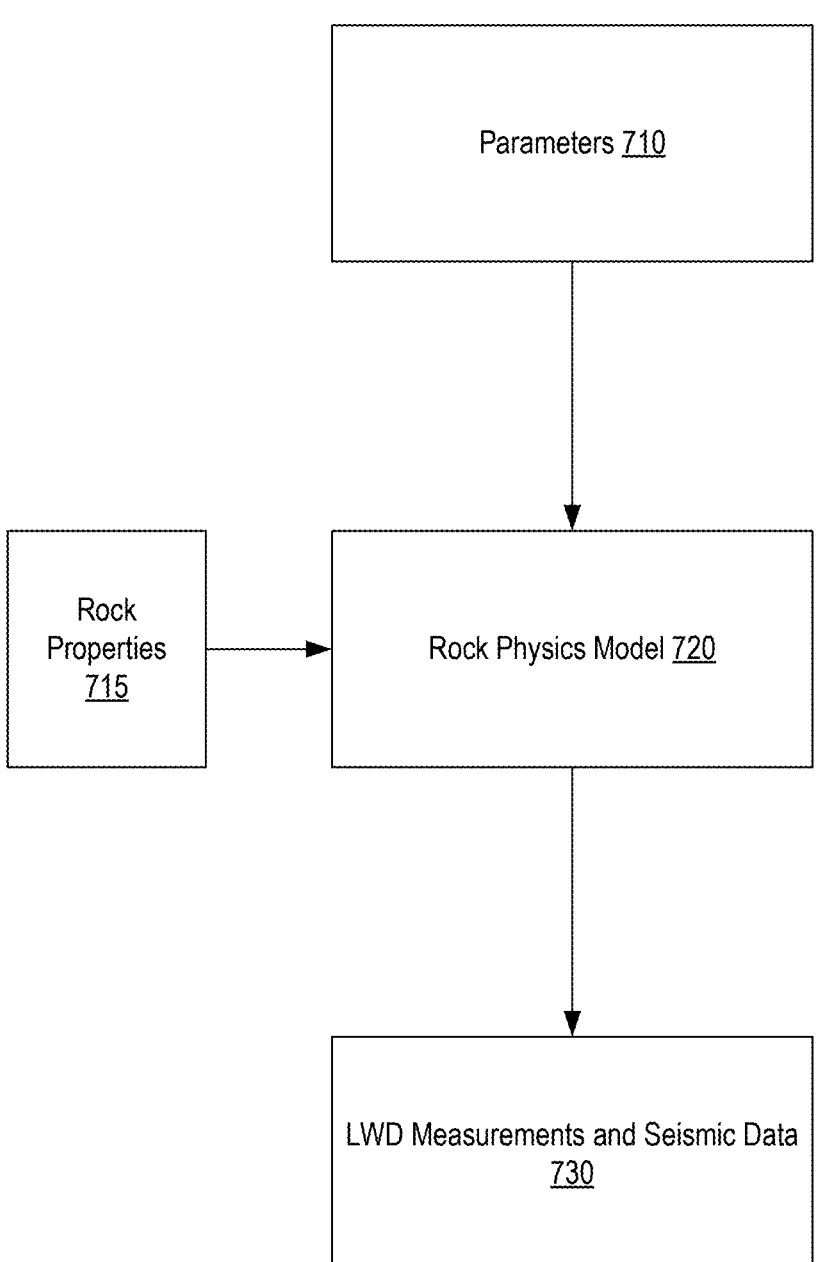
FIG. 7 illustrates an example of a workflow.

FIG. 7 shows an example of a workflow 700 that includes a parameters block 710, a rock properties block 715, a rock physics model block 720, and a LWD measurements and surface seismic data block 730. In the workflow 700, various relationships may be utilized, which may be empirical, physics-based, machine learning (ML) model-based, etc. For example, consider an approach that handles multidimensional data, such as, for example, three-dimensional data that may be organized as a cube (e.g., an array) where elements in the cube may be referred to as voxels. In such an example, a voxel may represent a volume of a subsurface region. For example, a voxel may be defined in part using physical dimensions of length, width, and height that correspond approximately to a physical volume of rock, which may be reservoir rock and/or another type of rock.

As an example, the workflow 700 may provide for performing a voxel inversion at a number of points in a 3D space. For example, consider defining an inversion as follows, where m is a vector:

$$m = \{\varphi, S_w, V_{CL}\}_i$$

where $\varphi$ is porosity, $S_w$ is water saturation, $V_{CL}$ is volume of clay, i is the cell number, for example, a voxel or a pixel position in a section of the 3D space, where each cell (e.g., spatial location) may have an associated triplet as vector.

As an example, a modified Simandoux equation may be utilized, for example, that includes isotropic resistivity, where a saturation exponent n may be utilized (e.g., consider n not equal to 2 where solution may be via recursive numerical iterations, etc.). For example, consider the following example equations:

$$\frac{1}{R_t} = \frac{S_w^n \varphi^m}{R_w} + S_w \frac{V_{CL}}{R_{CL}}$$

$$R_t = f(m, \theta_R : m, n, R_w, R_{CL})$$

As an example, acoustic impedance may be defined using a generalized Gassmann relationship, for example, as follows:

$$I_p = \sqrt{\rho \left( K_G + \frac{4}{3} \mu_m \right)}$$

$$K_G = g(m, \theta_G : K_w, K_{HC}, K_s, A)$$

$$\rho = h(m, \theta_D : \rho_w, \rho_{HC}, \rho_s)$$

In the foregoing equations, $K_G$ is the bulk modulus of fluid saturated rock (e.g., consider $K_{sat}$ as an alternative notation), $\mu_m$ is the shear modulus, and $\theta_G$ refers to an array of parameters upon which $K_G$ may depend, which can include, for example, a Krief exponent (e.g., experimentally defined, etc.), which may be, for example, approximately 3 or another appropriate value, which may depend, for example, on one or more variables (e.g., consider vertical depth, etc.). An article by Krief et al., 1990, A petrophysical interpretation using the velocities of P and S waves (Full-waveform sonic), The Log Analyst, 31, 355-369, is incorporated by reference herein in its entirety. As to $K_s$, it refers to the bulk modulus of the solid phase only, which may be utilized to define a sand component; noting that a solid phase may be decomposed, for example, to incorporate dependence on multiple components, such as, for example, sand and clay (e.g., $K_D$, $\mu_D$, etc.) to determine moduli of a dry phase (e.g., where the subscript "D" refers to dry). As to the parameters, $K_w$ and $K_{HC}$, these represent the bulk moduli for water and hydrocarbon(s), respectively. Further, in the foregoing equations, $\theta_D$ represents an array of parameters that may be utilized in computing bulk density (e.g., where the subscript "D" refers to density), which may include $\rho_w$, $\rho_{HC}$, and $\rho_s$, as water density, hydrocarbon density, and solid phase density, respectively. As an example, the solid phase density, $\rho_s$, it may be described as a function of volume fractions occupied by a number of constituents, for example, a number of minerals each with an associated volume fraction. As an example, an inversion may be performed in a manner using input parameters that may be specified using known values, values obtained from a priori knowledge of a reservoir being drilled, etc. For example, the arrays $\theta_G$ and $\theta_D$ may be composed of such input parameters where the values thereof may remain fixed during an inversion.

As an example, the parameters of the parameters block 710 may be represented as $\theta$; the rock properties of the rock properties block 715 may be represented as $m = \{m_i\}$; the rock physics model of the rock physics model block 720 may be represented as $g(m; \theta)$; and the LWD measurements and the surface seismic data of the block 730 may be represented as follows:

$$d = \{d_i\}$$

$$d_i = g(m_i; \theta) + \varepsilon_i$$

As indicated in FIG. 7, the workflow 700 may provide for determining reservoir properties (e.g., porosity, water saturation, and volume of clay) through a joint inversion of measurements, which include resistivity (e.g., isotropic resistivity) ($R_t$) and acoustic impedance ($I_p$). These measurements may be related to reservoir properties through a modified Simandoux relationship and through generalized Gassmann equations. As shown, such equations may have their own set of model parameters, which may be adjusted from one or more other types of available data, which may be obtained, for example, through petrophysical analysis of well logs, etc.

As an example, the workflow 700 may be adjusted to obtain reservoir properties through a joint inversion of anisotropic resistivity (e.g., $R_h$ and $R_v$) and acoustic impedance, for example, as related to reservoir properties through a generalized anisotropic rock physics model and generalized Gassmann equations. For example, consider the following relationship being utilized for an anisotropic resistivity rock physics model:

$$R_h, R_v = f(\varphi, S_w, V_{CL} \ \dots \ )$$

As an example, as to an anisotropic rock physics model, consider the following example equations:

$$f, g(m; \theta)$$

$$d_i = f, g(m_i; \theta) + \varepsilon_i$$

As an example, in a multilayered region, various rock physics models may be defined as to relationships between measurements and rock properties. For example, multiple models may be assigned to varying spatial distribution of lithologies present in a region. In such an approach consider the following example equation where an index, j, may be utilized to represent one or more layers:

$$f_i g_j h_j(\varphi, S_w, V_{CL} \ \dots \ )$$

As explained, one or more rock physics models may be defined using one or more techniques. For example, consider an empirical approach for defining anisotropy in a clay and sand material using one or more of the following equations:

$$R_v = V_{CL} R_{clay\_v} + (1 - V_{CL}) R_{SD}$$

$$\frac{1}{R_h} = \frac{V_{SH}}{R_{clay\_h}} + \frac{1 - V_{CL}}{R_{SD}}$$

$$\frac{1}{R_{SD}} = \text{Archie's Law}$$

$$R_{clay\_h}, R_{clay\_v} = f(\varphi, S_w, \dots \ )$$

As an example, a plot of resistivity anisotropy versus total porosity may provide for performing one or more regression techniques, which may provide for equations that may be utilized in modeling. As an example, shales with higher porosity and shallow burial may have lower resistivity anisotropy while shales with lower porosity and deeper burial may have higher resistivity anisotropy. An article by J-B. Clavaud, 2008, Intrinsic Electrical Anisotropy of Shale: The Effect of Compaction, PETROPHYSICS, VOL. 49, NO. 3, P. 243-260, is incorporated by reference herein in its entirety, which describes effects of compaction on shale anisotropy, including a ratio of Rv/Rh in shale laminations between hydrocarbon bearing sands laminations where such a ratio may be utilized as a parameter of a model that can impact water saturation estimates, particularly when a shale volume is relatively large, or in a transition zone.

As an example, a workflow may involve consideration of an isotropic environment and/or an anisotropic environment. Types of environments may include one or more of vertical transverse isotropy (VTI), tilted transverse isotropy (TTI), and one or more other types of environments. VTI is a type of transverse isotropy that has a vertical axis of rotational symmetry. For example, in layered rocks, properties may be considered to be uniform horizontally within a layer, but vary vertically and from layer to layer. TTI may occur where the axis of symmetry and the vertical axis form an angle (e.g., rotational symmetry around a tilted axis). As an example, one or more of the Thomsen parameters may be utilized in modeling an environment. For example, consider gamma as a fractional difference between SH-wave velocities in horizontal and vertical directions for a VTI medium; epsilon as a difference between P-wave velocities in horizontal and vertical directions, and delta as a parameter related to both near vertical P-wave speed variations and angular dependence of SV-wave speed.

As an example, a rock physics model may be defined analytically and/or theoretically. For example, consider defining a rock physics model using the effective medium theory (EMT). In materials science, EMT modeling may be utilized to describe macroscopic properties of one or more types of composite materials. For example, an EMT model may be developed from averaging multiple values of constituents that make up a composite material. At a constituent level, values of materials may vary and may be inhomogeneous. EMT may produce acceptable approximations which in turn describe useful parameters. For example, consider defining effective permittivity and/or permeability of a composite material as a whole. As an example, effective medium approximations may be or include descriptions of a medium (e.g., a composite material) based on properties and relative fractions of its components, as may be derived from computations and EMT.

As an example, consider use of EMT to define bulk anisotropic conductivity. In such an example, consider a composite material as including inclusions in a background medium. For example, consider a background medium that is a clean sand that may be defined using Archie's Law (e.g., Archie equation) or one or more other techniques. As an example, a background medium may be defined using one or more properties such as, for example, water saturation and porosity.

As an example, inclusions may be represented by one or more shapes, for example, consider oblate spheroids as aligned and stacked preferentially (e.g., which may be in accord with physical measurements, theory, etc.). As an example, shapes may be characterized using one or more geometric parameters, which may include, for example, aspect ratio, oblate shape parameters, etc. As an example, inclusions may include conductive inclusions and inclusions that represent interstitial space.

As an example, relationships between conductivities of conductive inclusions ($\sigma_1$), interstitial space ($\sigma_2$), and background medium ($\sigma_0$) may be defined as follows: $\sigma_1 > \sigma_2$, and $\sigma_2 \sim \sigma_0$. In such an example, the background medium may depend on, for example, one or more of water saturation, porosity, etc., and one or more geometric characteristics may be represented by a parameter $\gamma_g$. As an example, bulk anisotropic resistivity may be defined as follows:

$$< R_h >, \; < R_v >= f(\sigma_0, \sigma_1, \sigma_2, \gamma_g)$$

As explained, in various examples, di may describes input (measured) data. In such an approach, acoustic Impedance may be derived from surface seismic data acquisition as available for a region and electrical resistivity distribution may be obtained in real-time from LWD measurements. In such an approach, resistivity may be anisotropic and, for example, available as (i) a 2D plane along a borehole trajectory (e.g., consider a curtain section), (ii) a 2D plane transverse to the borehole trajectory, and (iii) a 3D volume around the borehole trajectory. As an example, resistivity may be available (e.g., via extrapolation) ahead of an end of a borehole (e.g., in front of a drill bit).

As an example, one or more workflows may provide for joint inversion of very deep directional resistivity logging while drilling measurements. In certain embodiments, the joint inversion includes surface seismic dataset around the wellbore and ahead of the drilling bit, in real-time while drilling the well.

As an example, an approach may involve obtaining a surface seismic dataset and using the surface seismic data set to invert for a 3D volume of acoustic impedance around a planned or currently being drilled borehole. In certain embodiments, this may be performed prior to performing one or more drilling operations. As an example, a 3D acoustic impedance volume may be calibrated according to one or more structural components in a subsurface region as may be updated in accordance with a calibration procedure. As an example, an acoustic impedance volume and a distribution of resistivity around a borehole may then be processed jointly to yield reservoir properties using one or more joint inversion techniques. In one embodiment, reservoir properties may be mapped in a 3D volume around at least a portion of a borehole.

In one embodiment, the 3D resistivity volume may be extrapolated to estimate expected resistivity distribution in front of a drill bit (e.g., beyond an end of a borehole). In such an example, extrapolation may be performed using one or more of multivariate stochastic modeling, inversion of LWD EM measurements, or one or more other techniques to yield information in front of a source exciting an EM field as part of a downhole tool. As an example, once an extrapolation is complete, a joint inversion process may be applied between acoustic impedance and resistivity volumes, for example, including an extension or extensions of measurements to positions beyond a drill bit (e.g., end of a borehole).

As an example, a multivariate stochastic model may be used to capture uncertainty of reservoir property estimation. As an example, a workflow may be implemented to enhance a joint inversion of ultra-deep directional resistivity (UDDR) logging while drilling measurements and surface seismic datasets using anisotropic resistivity data.

In various instances, one or more techniques for estimation of reservoir properties may yield a potentially biased estimation of reservoir properties due to the nature of an inherently undetermined problem. As an example, an inversion problem may be formulated and computationally involve solving for porosity, water saturation and volume of clay, for example, from two available data points, such as a datum point for acoustic impedance and a datum point for resistivity. In certain embodiments, such an approach may perform such computations at various points in space, for example, depending on data availability, data quality, data interpolation, etc.

As an example, a joint inversion may provide for addressing scenarios where a lack of data points exist, for example, by using an anisotropic response of electromagnetic measurements obtained using ultra-deep azimuthal resistivity (UDAR) EM LWD tools. As an example, given a relationship between vertical and horizontal resistivities and reservoir properties, as explained, a workflow may provide for setting up a problem to solve for porosity, water saturation and volume of clay using acoustic impedance, resistivity horizontal Rh (or $R_h$) and resistivity vertical Rv (or $R_v$) and/or one or more rock physics models.

As an example, a functional relationship between Rh and Rv with respect to porosity, saturation, volume of clay, and one or more other properties may be directed from one or more empirical relationships, one or more physical relationships, one or more machine learning models (ML models), etc. As an example, a functional relationship may be derived using one or more effective medium theory approaches. As an example, one or more ML models may provide for determining one or more parameter values, for example, consider values for one or more parameters of a rock physics model (e.g., as may depend on log and/or other downhole data).

As an example, a framework may provide for estimating secondary porosity, for example, through joint inversion of seismic data and ultra-deep directional resistivity anisotropic measurements (e.g., consider a Bayesian approach to joint inversion, etc.). As an example, one or more fluid-filled fractured zones may potentially yield preferential flow paths for electrical currents excited by ultra-deep directional EM LWD measurements. In such an example, anisotropic response may be related to fracture orientation together with fluid saturation, porosity, and/or one or more other characteristics. As an example, one or more joint inversion techniques may be modified, adjusted, etc., for example, to incorporate one or more functional relationships between fracture orientation and resistivity anisotropy together with porosity, fluid saturation, and one or more other properties.

As an example, one or more approaches may be used in connection with saturation mapping of fluids in subsurface geologic strata, for example, through knowledge of water salinity and temperature, hydraulic boundaries mapping in subsurface strata, imaging and detection of trapped fluids in geologic formations, etc.

As an example, one or more reservoir characterization objectives may aim to estimate one or more petrophysical properties of one or more prospective hydrocarbon traps and, for example, aim to reduce uncertainty of an interpretation. As explained, a computational framework may provide for implementing one or more workflows that may involve petrophysical joint inversion of seismic and EM attributes to estimate a petrophysical model, for example, in terms of porosity and water saturation as physical properties that characterize a subsurface environment. Such an approach may realize a joint inversion within a probabilistic structure, for example, as may be provided via a Bayesian approach. As an example, a framework may be utilized to implement a workflow applied to a real hydrocarbon exploration scenario to evaluate its contribution to an interpretation phase. As an example, one or more 3D volumes of estimated porosity and saturation may demonstrate how a joint inversion of acoustic impedance and electrical resistivity can provide a quantitative description of reservoir properties and, for example, with it, a measure of uncertainty, which may be consistent with a petrophysical model and observations.

FIG. 8 shows an example of a system 800 that includes an input 810, integrated predictive geosteering (IPG) framework components 850, and output 880 and an example of a method 801 that includes reception blocks 802 and 803, a generation block 804, a technique(s) block 805, a generation block 806, and an implementation block 808.

As an example, a resistivity distribution may be from ultra-deep azimuthal resistivity (UDAR), interpreted resistivity models, etc. As an example, seismic data may include raw data, derived products, etc. As an example, seismic data may include interpreted geometrical objects (surfaces, faults, geobodies), surfaces, spatial distribution of acoustic impedance, signal processing products (e.g., wavelet extraction, filtering, etc.), etc. As an example, input may include integration control parameters, which may include, for example, parameters to determine one or more aspects pertaining to the IPG framework components 850. For example, consider expected correlation lengths, uncertainties of input data and/or derived products (e.g., uncertainty of interpreted surfaces, uncertainty of well trajectory, uncertainty of resistivity distribution, etc.).

As an example, a geometrical update may refer to updating spatial positions of seismic data and/or derived products. As an example, the system 800 may provide for extrapolating data and/or derived products that are available generally behind a bit (e.g., resistivity, reservoir properties such as porosity, water saturation, volume of shale, etc.) to positions ahead of the bit and/or around a borehole.

As an example, the system 800 may provide for estimating uncertainty in a resulting geometry update and/or forward prediction. For example, consider determination of confidence limits of an interpreted surface extrapolated to positions away from a drill bit, uncertainty of resistivity that has been predicted in front of a drill bit, uncertainty of reservoir properties (e.g., porosity, saturation, etc.), etc.

As an example, the system 800 may provide for repositioning of seismic data and/or derived products (e.g., surfaces, faults, acoustic impedance data, etc.).

As an example, the system 800 may provide for generation of a newly created distribution of reservoir properties (e.g., resistivity, porosity, water saturation, shale content, lithology, etc.), which may be, for example, extrapolated to positions in front of a drill bit (e.g., beyond an end of a borehole).

As an example, the system 800 may provide for generation of newly created geometrical objects, such as, for example, one or more of surfaces, fault planes, geobodies, which may be used to quantify and/or display for analysis uncertainty of a prediction and/or updated position of seismic data and/or derived products. As an example, a workflow may be automated using an inversion, such as, for example, an acoustic impedance and resistivity inversion, which may be performed during a drilling operation. As to examples of objects, in various instances fluid contact may be of interest (e.g., consider a water zone). In various instances, fluid contact may be identified via an inversion (e.g., resistivity inversion) where such an object may be used to improve a workflow, for example, as water may have a relatively strong signal response in resistivity when compared to acoustic impedance. As an example, a joint inversion may proceed in a simultaneous manner and/or a sequential manner.

As an example, the system 800 may provide for generation of newly created reservoir properties distributions, which may be utilized for one or more purposes (e.g., quantify uncertainty of a reservoir property distribution, etc.).

As shown, the method 801 may include the reception block 802 and 803 for receiving seismic data and resistivity data, respectively, which may be in one or more forms (e.g., real, modeled, synthetic, etc.) that are based at least in part on some amount of knowledge of a subsurface region that includes a borehole to be lengthened through drilling. As shown, the generation block 804 may generate synthetic seismic data utilizing the one or more techniques 805. As explained, one technique may involve generating reflectivity data from resistivity data. As shown, the generation block 806 may provide for generating a displacement field. For example, consider comparing or otherwise assessing received seismic to synthetic seismic. As explained, one approach may involve comparing reflectivity data to reflectivity data derived from resistivity. As an example, an assessment may involve applying subtraction, matching, fitting, etc. As shown, the method 801 may include an implementation block 808 for implementing the displacement field. For example, consider implementing the displacement field in geosteering to steer a drill bit in a borehole to length the borehole.

As an example, the method 801 may be a real-time or online method whereby the method 801 is executed responsive to receipt of the resistivity data. For example, consider a directional drilling operation where a tool of a drillstring acquires resistivity data that may be transmitted to one or more framework components to generate synthetic seismic data. In such an example, a displacement field may be generated, for example, using already received seismic data, etc., which, in turn, may be utilized to control the drillstring in a manner that causes a drill bit to move in a particular direction in view of locations of subsurface structures positioned at least in part via the displacement field. In such an example, the method 801 and/or parts thereof may be performed in a loop (e.g., a feedback loop, etc.). As an example, the method 801 may be part of a control method for controlling one or more aspects of directional drilling.

As to synthetic seismic data, a method may include generating multidimensional synthetic seismic data (e.g., 2D and/or 3D), in the vicinity of a borehole. In such an approach, properties may be correlated to LWD measurements of higher resolution than standard seismic data. As an example, synthetic seismic data may be generated according to one or more factors, which may facilitate leveraging such data in combination with log data (e.g., LWD measurements, etc.). For example, consider generating synthetic seismic data with particular properties, vertical and lateral resolution(s), structural complexity, etc. In such an example, one or more factors may tailor synthetic data for a particular geosteering application. As an example, a method may involve generating suitable synthetic seismic data directly or indirectly. For example, a direct approach may consider factors as part of a simulation process; whereas, an indirect approach may utilize a more generic simulation process and then transform results thereof in consideration of one or more factors. As explained, synthetic seismic data may be generated for a particular purpose, which can be for computation of one or more quantities, metrics, properties, etc., which may be spatially distributed (e.g., in a region about a borehole, in a region beyond an end of a borehole, etc.). As an example, a definition of a look ahead metric, etc., may provide for defining one or more factors to be taken into account when generating synthetic seismic data. For example, as explained, resolution may be a factor.

As explained, improved geosteering may improve borehole characteristics such that completions and production may be improved, for example, by reducing the number of wells to be placed, by creating better wells with greater certainty, by meeting production targets, by reducing CO2 emissions, etc. For example, by achieving a production target for a field or an area thereof with fewer wells, energy may be conserved and, correspondingly, reducing emissions of one or more greenhouse gases (GHGs) such as CO2.

As an example, a framework may provide for improved understanding of a subsurface environment at a borehole, particularly where such subsurface environment may be complex, heterogenous, etc. As an example, a framework may provide for delineation of structural features and/or fluid type and distribution.

As an example, a framework may provide for integration of ultra-deep directional resistivity logging while drilling (LWD) measurement with surface seismic data to map distribution of one or more reservoir properties.

Figure 9:
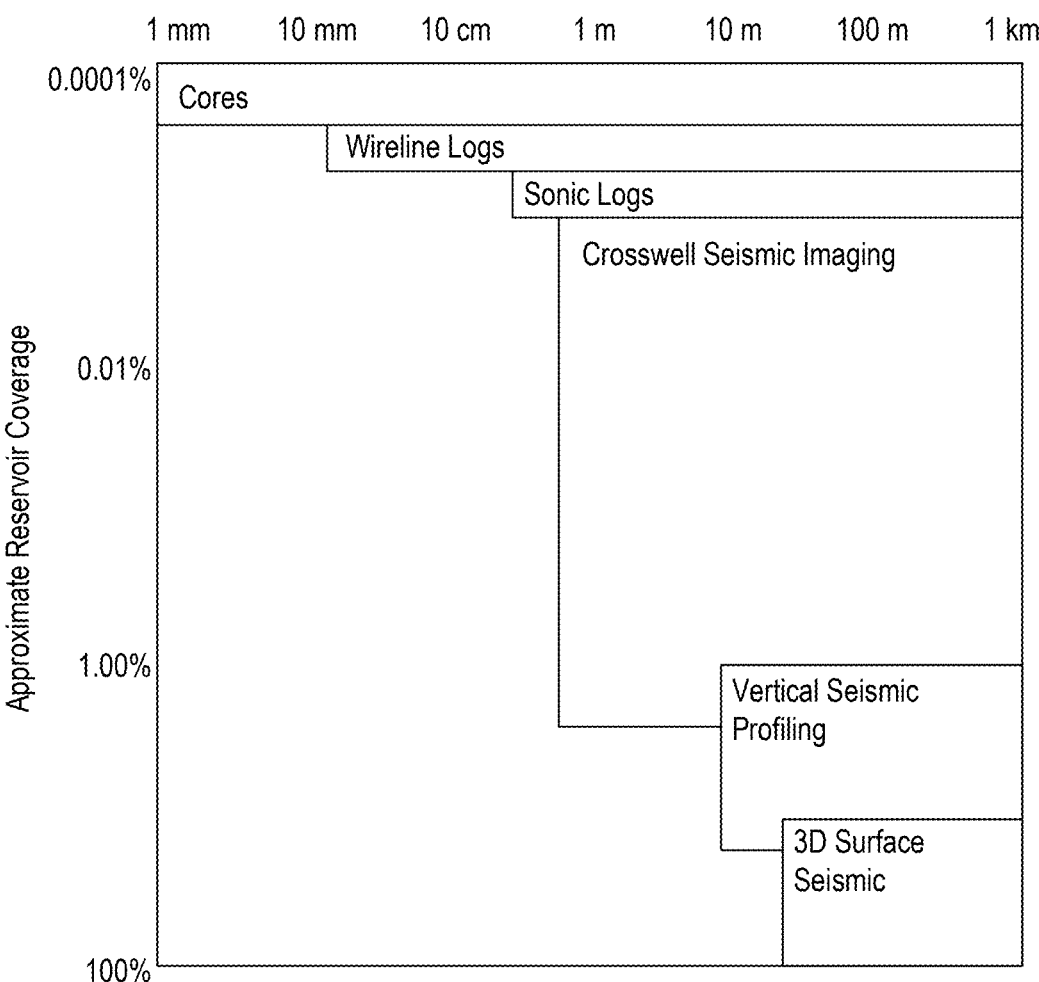
FIG. 9 illustrates an example of a plot of approximate reservoir coverage versus approximate maximum vertical resolution for various techniques.

FIG. 9 shows an example plot 900 of approximate reservoir coverage versus approximate maximum vertical resolution for various techniques, technologies, etc. The plot 900 demonstrates various aspects of multiscale and multi-physics as applied to reservoir characterization. As shown, physical cores extracted from a subsurface region may provide for relatively small coverage (e.g., the diameter of a borehole) yet may provide for vertical resolution spanning from 1 mm (or less) to 1 km (or more). Cores are a physical technique whereby material from a subsurface region is accessed and extracted. Hence, cores represent a physically invasive technique that demands physical access to material in a subsurface region. In the example plot 900, various other approaches, namely, wireline logs, sonic logs, crosswell seismic imaging and vertical seismic profiling, demand physical invasion as well in that a borehole is required. In the example plot 900, the 3D surface seismic approach may be considered non-invasive in that a borehole is not necessarily required. While 3D surface seismic is mentioned, 1D and 2D surface seismic approaches exist, which may also be performed without a borehole.

As indicated in the plot 900, a relationship may exist between how invasive a technique is and its ability to achieve a fine resolution. As shown, in various instances, downhole tools (e.g., LWD tools, wireline tools, etc.) may be capable of achieving vertical resolutions of the order of 10 mm or 20 cm to 30 cm (e.g., sonic tools). In contrast, seismic imaging approaches with a borehole or boreholes (e.g., crosswell) may be capable of achieving vertical resolutions of the order of approximately 1 meter, noting that vertical seismic profiling may be limited to approximately 10 meters in vertical resolution. Yet, in further contrast, surface seismic imaging may be limited to approximately 15 meters in vertical resolution.

As to downhole tools, their resolution may depend on their underlying types of physics to perform data acquisition. For example, consider physics based on radiation (e.g., gamma rays), physics based on NMR, physics based on EM, etc. Hence, as explained, reservoir characterization can be a multiscale, multi-physics subsurface integration problem.

Workflows integrating surface seismic datasets together with logging while drilling (LWD) ultra-deep azimuthal resistivity (UDAR) measurements have been implemented to enhance structural interpretation of a reservoir's main strata observed while drilling around a high-angle well (see Nickel et al., 2016) and in front of the drilling bit (Salim et al., 2018, Tarchiani et al., 2017).

Ultra-deep directional electromagnetic (EM) measurements acquired while drilling may provide relatively highly resolved, reservoir-scale, images with radial depths of investigation (DOI) in excess of 30 m (Seydoux et al., 2014), responding to the true 3D nature of what is generally an inhomogeneous electrical resistivity distribution around a borehole. Resolving power of very deep directional resistivity tools ahead of the drilling bit, however, tends to be limited, due to decreasing measurement sensitivity resulting from the diffusive nature of EM fields induced in a formation. Hence, inferring geo-electric structure ahead of a drill bit from EM LWD measurements alone tends to be challenging. Various efforts have been undertaken to attain ahead of the bit predicting capabilities, for example, by enabling integrated interpretation of resistivity distribution obtained from ultra-deep azimuthal EM measurements together with surface seismic data (Salim et al., 2018, Borgos et al., 2019). Enhanced seismic interpretation at reservoir-scale (see, e.g., the reservoir coverage in the plot 900) may yield a relatively focused description of structures expected around a borehole trajectory as well as, to some extent, ahead of a drill bit. However, in such an approach, there is a coarsening of resolution after processing using a surface seismic dataset as the surface seismic dataset may have a vertical resolution of approximately 5 meters and an even coarser horizontal resolution, which may be of the order of 10 meters or more. As explained, various techniques may achieve sub-meter vertical resolution. Further, various techniques may achieve sub-meter horizontal resolution (e.g., lateral resolution). For example, very deep directional EM measurements may provide for sub-meter lateral sensitivity for determining geo-electric structures effectively around a borehole thereby allowing for generation of relatively high-resolution images.

As explained, a downhole tool requires a borehole such that acquired data may be for subsurface characteristics around the borehole. Where a downhole tool is on a drillstring with a drill bit, generally, that downhole tool is located at an offset distance from the drill bit. As to the distance, it may depend on one or more factors, particularly as to how a bottom hole assembly (BHA) is constructed for one or more purposes. In various instances, the distance may depend on operational constraints resulting from drillstring and formation interactions, bit and formation interactions, etc. For example, a downhole tool may be set at a location due to shock and vibration factors where that location may be a distance from a drill bit as a maximum practical distance or a distance that may not be as impacted by shock and/or vibration (e.g., consider formation of nodes and antinodes along a drillstring due to vibration). Accordingly, given that a downhole tool may be a distance from a drill bit, in such a scenario, that downhole tool cannot be at the bottom or end of a borehole. Hence, the ability of a downhole tool to acquire measurements ahead of an end of a borehole can be limited, which may be limited at least partly due to the distance between a drill bit and the downhole tool on a drillstring.

Various approaches to integration of logging while drilling measurements and surface seismic focus on enhancing structural interpretation both around a borehole and ahead of a drill bit. As an example, a framework may provide for implementing one or more integration workflows to enhance reservoir petrophysical property estimates, such as, for example, one or more of porosity, fluid saturation, volume of clays, etc. In a while-drilling, real-time process, integration of inversion for reservoir properties may provide added information around a borehole being drilled and also in front of a drill bit. In a static setting, where data are already available, integration of reservoir properties may provide for yielding a global update of a 3D model incorporating datasets from multiple boreholes.

Various techniques for integrating surface seismic and electromagnetic data to obtain 3D volumes of reservoir property distribution are discussed in articles by Bachrach, 2006; Barclay et al., 2008; Murineddu et al., 2008; and Carcione et al., 2007 that involve linking well log measurements, surface and seafloor marine remote sensing (e.g., controlled source electromagnetic (CSEM)), etc. However, these articles do not disclose linking LWD very deep directional resistivity measurements with the surface seismic datasets and/or with borehole seismic datasets (see, e.g., surface seismic and various types of borehole seismic in the example plot 900).

As an example, a framework may provide for implementation of one or more workflows that include performing a joint inversion of seismic data and LWD very deep directional resistivity measurements, which may include ultra-deep directional resistivity measurements. In such an example, the framework may utilize such a joint inversion for characterization of reservoir properties (e.g., porosity, fluid saturation, etc.) in a while-drilling scenario. In such an example, the framework may be implemented to yield enhanced information of a subsurface region (e.g., a reservoir, formation(s) adjacent to a reservoir, etc.) around a borehole and/or ahead of an end of the borehole. As explained, in a while-drilling scenario, a drillstring in a borehole includes a drill bit where the drill bit can be in contact with material at an end of the borehole to break that material to thereby lengthen the borehole. As described herein, seeing ahead of a drill bit generally refers to seeing ahead of an end of a borehole. As an example, a framework may utilize seismic data and deep resistivity data (e.g., very deep resistivity data) to improve reservoir characterization ahead of an end of a borehole during drilling of the borehole whereby a drill bit is in contact with material at the end of the borehole to lengthen the borehole. In such an example, drilling may be controlled such that a direction of the drill bit is controlled with respect to one or more structural features of a subsurface region using framework generated characterizations thereof.

Figure 10:
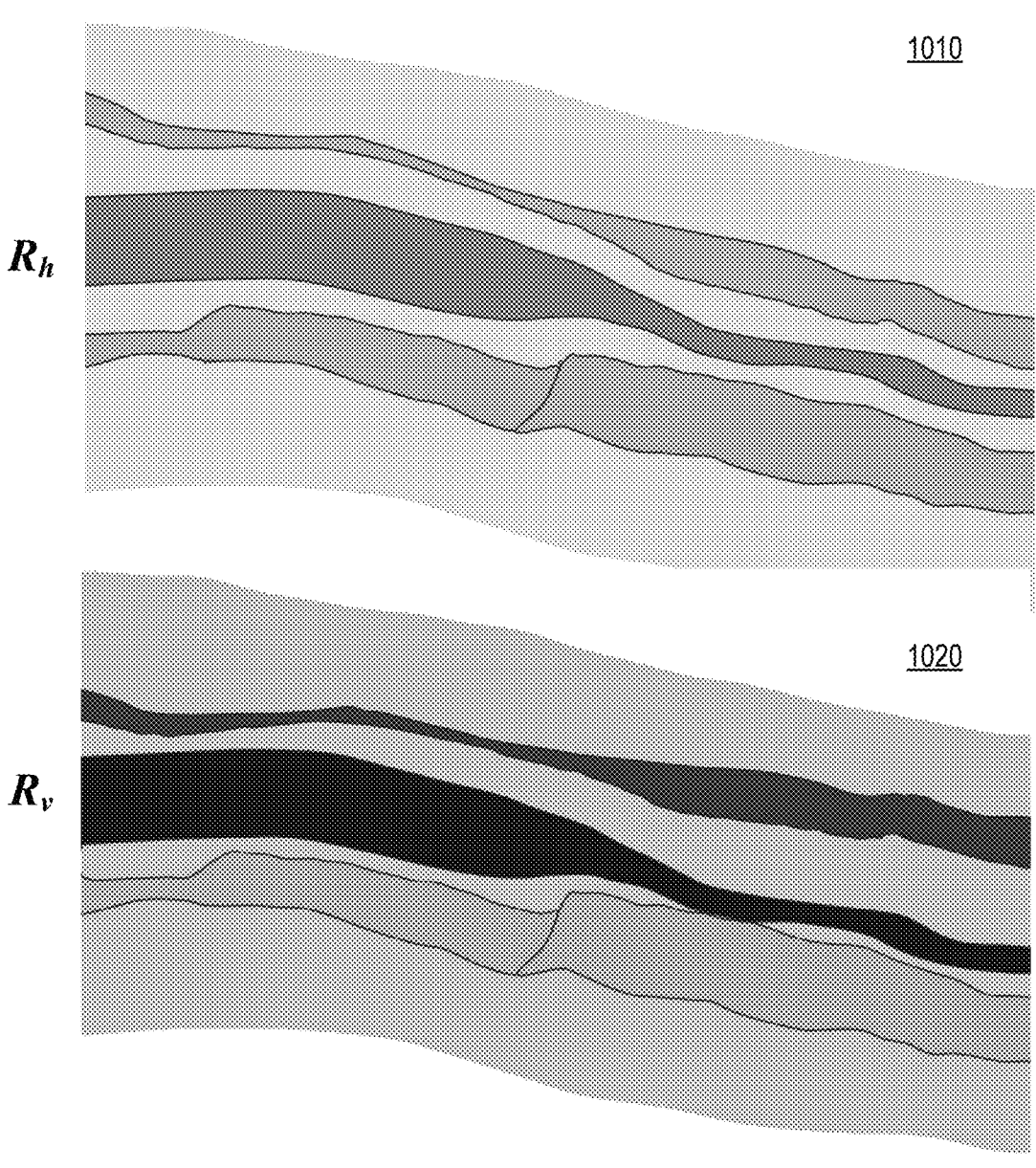
FIG. 10 illustrates example images of horizontal resistivity and vertical resistivity in a subsurface region.

FIG. 10 shows example images 1010 and 1020 for resistivities in a subsurface region where various differences exist as to horizontal resistivity and vertical resistivity. As shown, a grayscale representation may be utilized as to resistivity values where differing grayscale values in common spatial locations indicate that horizontal resistivity and vertical resistivity differ. As explained, a region may include anisotropies with respect to measurements, which may be relevant to drilling, particularly, geosteering in a substantially lateral reservoir.

Figure 11:
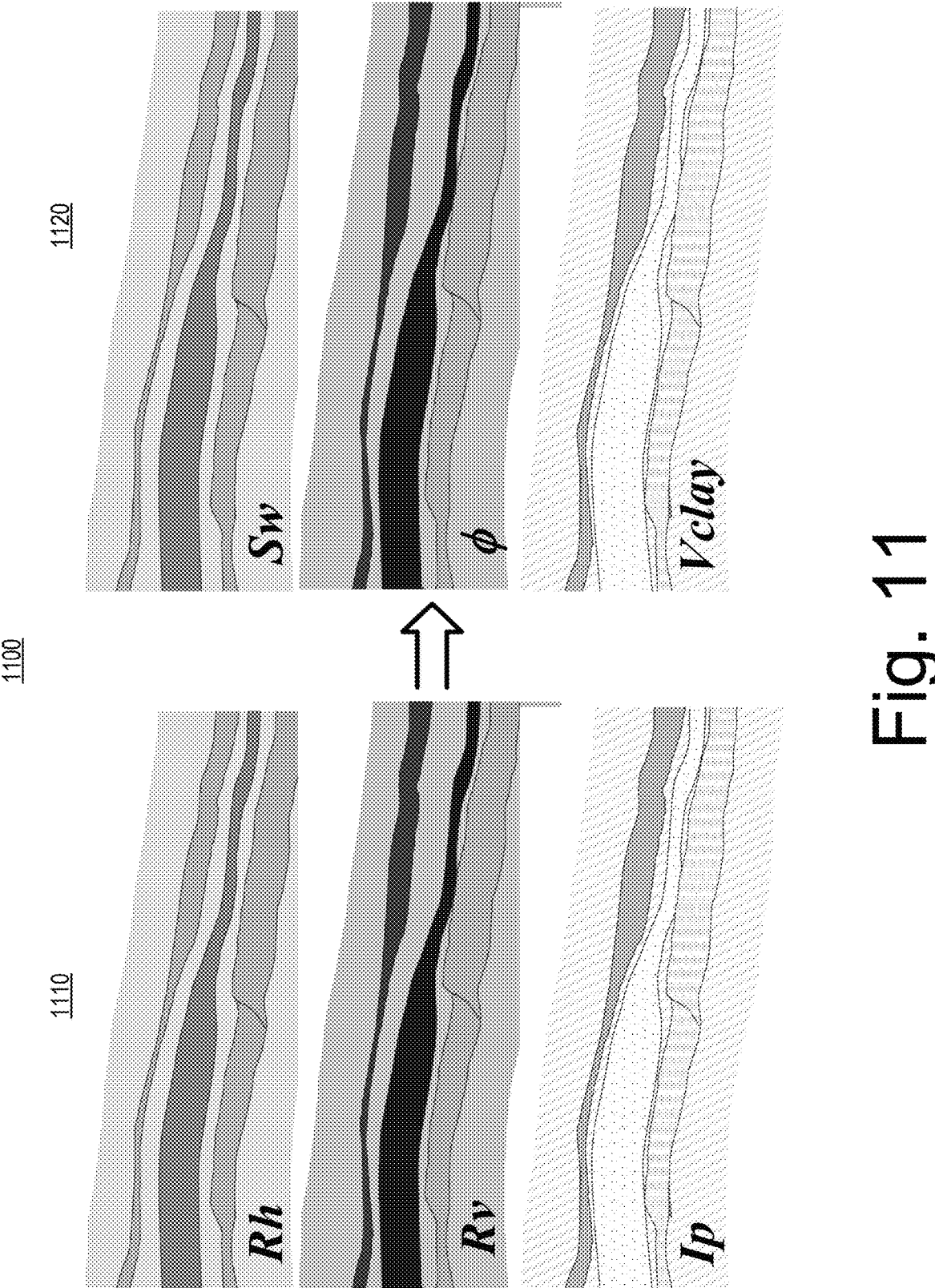
FIG. 11 illustrates an example of a method that inverts measurements for properties.

FIG. 11 shows an example of a method 1100 illustrated with respect to sets of images 1110 and 1120 where the set of images 1110 includes images for three measurements, horizontal resistivity, vertical resistivity, and acoustic impedance, and where the set of images 1120 includes images for three reservoir characteristics, water saturation, porosity, and volume of clay. In the example of FIG. 11, the method 1100 may be implemented using a framework in real-time responsive to receipt of measurements to perform a joint inversion of the measurement to generate one or more reservoir characteristics. In such an example, geosteering may be performed using one or more of the one or more reservoir characteristics. As shown, the reservoir characteristics may be spatially distributed and may be delineated using one or more structural features (e.g., boundaries, interfaces, etc.). As an example, a framework may provide for rendering a GUI that includes one or more of the images in one or more of the sets of images 1110 and 1120, which may be overlaid using a borehole trajectory, equipment location, etc.

Figure 12:
FIG. 12 illustrates an example of a method that inverts measurements for properties for one or more layers.

FIG. 12 shows an example method 1200 where one or more offset wells (e.g., offset well X and offset well Y) may exist in a subsurface environment where a borehole is being drilled into a region that may be defined as including different materials, which may be structured as layers, etc. For example, consider layers 1, 2, . . . , j. In such an example, each of the different materials (e.g., layers) may be defined using an appropriate rock physics model. In such an example, a number of different rock physics models may be utilized.

In the example of FIG. 12, the method 1200 may include receiving measurements as to spatially varying distributions of anisotropic electrical resistivity (e.g., Rh and Rv) as acquired from one or more LWD tools. In such an example, measurements may be received as to spatially varying distribution of acoustic impedance (e.g., Ip) as acquired from one or more surface seismic surveys, one or more crosswell seismic surveys, one or more vertical seismic profile surveys, etc. (see, e.g., the plot 900). As an example, one or more offset well logs may be utilized to calibrate one or more functional relationships (e.g., rock physics models) between one or more measurements and rock properties. As an example, functionals (e.g., rock physics models $f_j$, $g_j$, $h_j$ ($\varphi$, Sw, $V_{CL}$ . . . )) may be utilized to define relationships between measurements and rock properties. As explained, multiple models may be assigned to varying spatial distributions of lithologies present in a region of interest.

Figure 13:
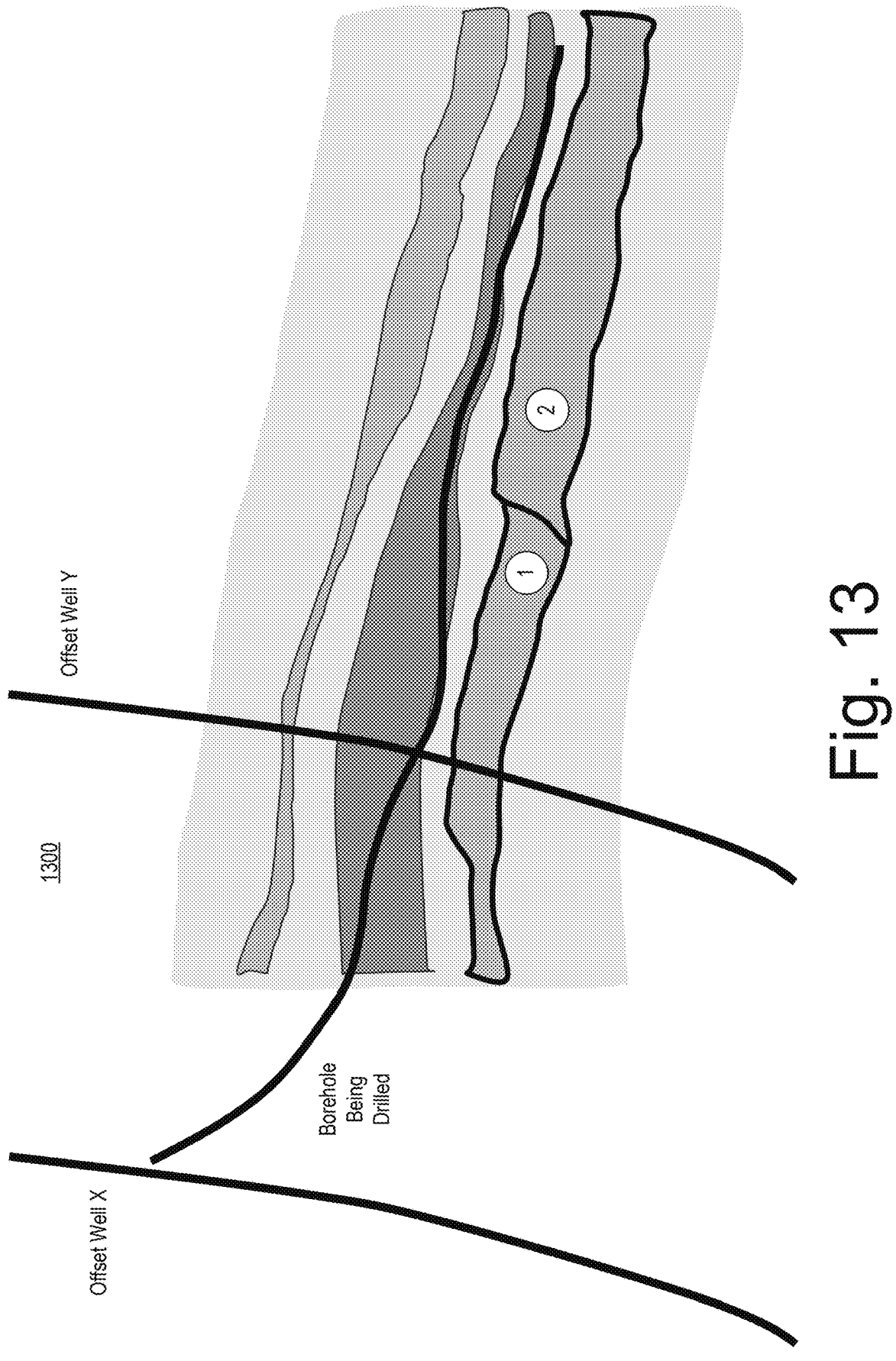
FIG. 13 illustrates an example of a method that inverts measurements for properties for one or more zones.

FIG. 13 shows an example method 1300 where one or more offset wells (e.g., offset well X and offset well Y) may exist in a subsurface environment where a borehole is being drilled into a region that may be defined as including different materials, which may be structured as sub-regions, etc. For example, consider sub-regions 1 and 2, which may be two of two or more sub-regions. In such an example, each of the different materials (e.g., layers, sub-regions, etc.) may be defined using an appropriate rock physics model. As an example, a sub-region or a layer may be a zone where, for example, one or more zones may be defined within a resistivity distribution such that one or more different lithologies may be assigned and correspondingly, different rock physics models may be defined within each zone; noting that in some instances, different sub-regions may be of a common material such that a common rock physics model may be utilized for one or more zones.

As an example, a framework may provide for identification of one or more zones. For example, consider an image analysis technique, a data analysis technique, etc. As an example, one or more machine learning models (ML models) may be utilized to define a zone or zones. As an example, consider a convolution neural network (CNN) model, which may be configured for identification and segmentation (e.g., consider a U-Net type of architecture with an encoder, a decoder, and optionally skip connections). In such an example, one or more zones, one or more interfaces, etc., may be identified, classified, etc.

As an example, one or more functional relations may be calibrated and/or fine-tuned using offset well measurements of one or more of resistivity, acoustic impedance, and rock properties. As an example, one or more functional relations may be fine-tuned using well log measurements acquired while drilling (e.g., using one or more MWD tools) as may be acquired for a borehole trajectory as being drilled and/or during tripping (e.g., running-in-hole (RIH) and/or pulling-out-of-hole (POOH)).

Figure 14:
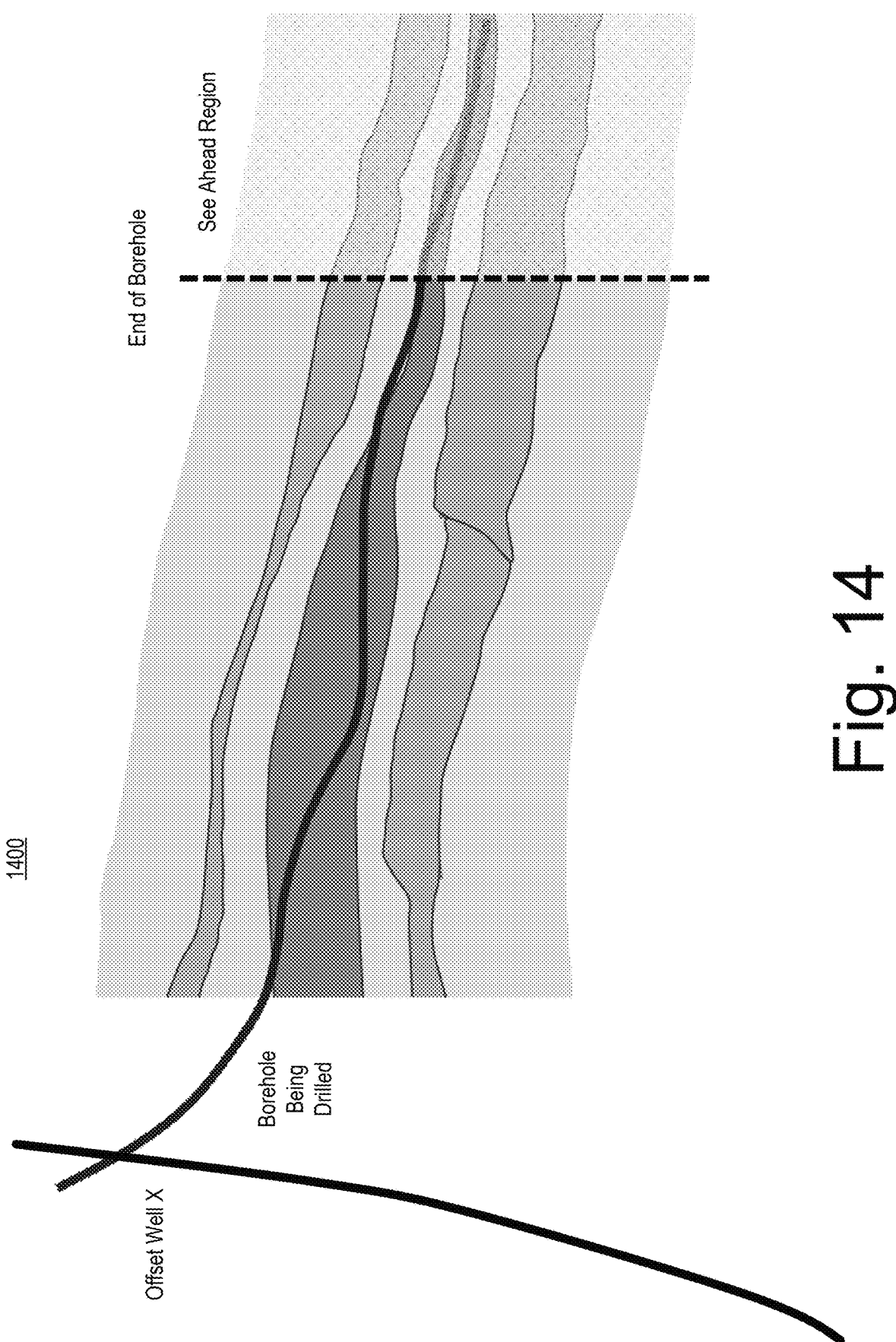
FIG. 14 illustrates an example of a method that inverts measurements for properties for a region beyond an end of a borehole.

FIG. 14 shows an example of a method 1400 that includes characterizing a subsurface region beyond an end of a borehole, which may be referred to as a see ahead region (e.g., a look-ahead region or LAR). As explained, subsurface structures may vary spatially, which may vary with respect to composition, fluid content, etc. As shown in the example of FIG. 14, layers may be dipping with varying thicknesses. Where geosteering of a drill bit aims to achieve acceptable reservoir contact between a borehole being drilled and a reservoir, generation of properties in a see ahead region may improve reservoir contact, for example, via controlled geosteering. In such an example, a borehole may be generated, as a product of drilling, where the borehole may possess desirable quality, which may be characterized via integrity, distance from one or more boundaries, etc. For example, consider a boundary for a layer that may pose one or more risks as to water intrusion, borehole integrity, completions workflows, etc.

As an example, a framework may provide for implementation of a joint inversion of very deep directional resistivity logging while drilling (LWD) measurements and surface seismic datasets (e.g., and/or one or more other types of seismic data), around borehole and/or ahead of a drill bit at an end of a borehole, in real-time while drilling the borehole to lengthen the borehole. In such an example, ultra-deep directional resistivity LWD measurements may be utilized, as available and/or as appropriate.

As an example, a workflow may include accessing a surface seismic dataset to provide a 3D volume of acoustic impedance around a predefined (planned) or currently being drilled borehole. In such an example, the 3D volume of acoustic impedance may be generated prior to one or more phases of drilling (e.g., consider an approach that drills a borehole in sections where each section may be of a smaller diameter using a smaller diameter drill bit, etc.). As an example, such a workflow may include calibrating the 3D acoustic impedance volume, for example, according to structural components updated in accordance to one or more calibration procedures (see, e.g., Nickel, 2016 or Salim, 2018). As an example, such a workflow may involve processing acoustic impedance volume and distribution of resistivity around a common portion of a borehole jointly to yield one or more reservoir properties (e.g., consider using one or more joint inversion techniques such as, for example, a technique described in Dell'Aversana, 2011, etc.). As an example, such a workflow may map the one or more reservoir properties in a 1D, 2D, and/or 3D region around at least a portion of the borehole. As explained, a workflow may include generating values for one or more properties in a region ahead of an end of a borehole.

As an example, a link between seismic derived data (e.g. acoustic impedance, reflectivity, etc.) and spatial distribution of electrical resistivity may be realized through one or more techniques. For example, as explained, one or more functional, analytical relationships (e.g., rock physics models) may be utilized, which may include a Gassman substitution for seismic and one or more of Simandoux (see, e.g., Simandoux, 1963), Indonesia (see, e.g., Carcione, 2007), for resistivity. As explained, one or more empirical laws may be defined through one or more stochastic analyses (see, e.g., Grana, 2018). As an example, one or more functional relationships may be defined between log measurements acquired while drilling, for example, consider one or more of sonic, gamma ray, density, and multi-component resistivity.

As an example, a 1D, 2D, or 3D resistivity region may be extrapolated to estimate expected resistivity distribution in front of a drill bit (e.g., ahead of or beyond an end of a borehole). As an example, extrapolation may be performed using one or more techniques. For example, consider use of multivariate stochastic modeling, inversion of LWD EM measurements to yield information in front of an LWD tool source exciting EM fields, etc. As an example, once an extrapolation has been performed, a joint inversion process may then be applied between the acoustic impedance and resistivity volumes including the extension of the LWD measurements to positions beyond a drill bit.

As an example, a framework may provide for performing a joint inversion of very deep directional resistivity logging while drilling (LWD) measurements and surface seismic datasets (e.g., and/or one or more other seismic datasets) around a borehole and ahead of a drill bit, in real-time while drilling the borehole, using a stochastic model to capture uncertainty of reservoir property estimation of one or more reservoir properties. In such an example, ultra-deep directional resistivity LWD measurements may be utilized, as available and/or as appropriate.

As an example, a framework may provide for utilization of one or more of various strategies for inversion of one or more rock physical parameters (e.g., porosity, saturation, volume of clay, etc.). For example, consider utilization of a deterministic inversion (see, e.g., Dell'Aversana, 2011), a stochastic inversion, a Monte Carlo simulation, etc.

As an example, a framework may provide for enhancing joint inversion of very deep directional resistivity logging while drilling (LWD) measurements and surface seismic datasets (e.g., and/or one or more other seismic dataset) using anisotropic resistivity data. For example, consider an article by Miotti, 2013, which describes a technique that may be employed to yield a potentially biased estimation of reservoir properties due to an inversion being inherently underdetermined problem. As an example, an inversion problem may require solving for at least porosity, water saturation, and volume of clay from two available data points (e.g., acoustic impedance and resistivity). As an example, an inversion may be performed at each of a number of points in space (e.g., 2D, 3D) where data may be available. In such an example, the inversion problem is fundamentally underdetermined.

As an example, to address a lack of data points, a framework may provide for using an anisotropic response of EM measurements acquired by a very deep directional EM LWD UDAR tool; noting that very deep can include ultra-deep. In such an example, both vertical resistivity and horizontal resistivity measurements may be acquired, which depend on reservoir properties. In such an example, a framework may structure an inversion problem for solving of porosity, water saturation, and volume of shale, for example, using acoustic impedance (Ip), resistivity horizontal (Rh) and resistivity vertical (Rv).

As an example, one or more functional relationships between Rh and Rv with respect to porosity, saturation, volume of clay, etc., may be derived from one or more empirical relations, for example, as described in an article by Clavaud (2008), or, for example, as may be derived via one or more EMT approaches, for example as described in an article by Bachrach (2011).

As an example, a framework may provide for estimating secondary porosity through joint inversion of seismic data and very deep directional resistivity anisotropic measurements.

As an example, a framework may provide for assessing one or more fluid-filled fractured zones that may potentially yield preferential flow paths for one or more electrical currents excited in very deep directional EM LWD measurements. As an example, an anisotropic response may be related to fracture orientation together with fluid saturation, porosity, etc. As an example, a framework may provide for generating information as to one or more fractures, whether natural and/or artificial.

As an example, a framework may provide for implementation of one or more joint inversion techniques, which may, for example, be modified to incorporate one or more functional relationship between fracture orientation and resistivity anisotropy, for example, together with one or more of porosity, fluid saturation, etc.

As an example, a framework may provide for saturation mapping of fluids in subsurface geologic strata, for example, through knowledge of water salinity and temperature. As an example, a framework may provide for mapping of hydraulic boundaries in subsurface strata. As an example, a framework may provide for imaging and detection of trapped fluids in a geologic formation.

As explained, in various examples, seismic data from one or more sources and LWD tool data may be utilized to generate values of one or more characteristics of a subsurface region, which may be or include a reservoir. As explained, such values may be generated in real-time responsive to receipt of LWD tool data, which may be transmitted during drilling or during a non-drilling period, such as, for example, when a length of drillpipe may be added to a drillstring.

As an example, an LWD tool may be part of a drillstring that is wired (e.g., conductive wire, fiber optic, etc.) and/or that includes one or more transmission mechanisms (e.g., mud-pulse telemetry, electromagnetic telemetry, etc.). As an example, LWD data may be transmitted during drilling, whether rotation is via surface equipment and/or a downhole motor, and/or while not drilling, which may be a stationary period (e.g., consider a MWD survey period, a connection period, etc.). As an example, mud-pulse telemetry may be performed in one or more of various circumstances, for example, whether or not a drill bit is being rotated and/or whether or not mud is being pumped, noting that various types of mud-pulse telemetry equipment depend on flow of mud (e.g., pulses may be imparted to stationary mud and/or to flowing mud).

During drilling of a length of a stand of drillpipe of a drillstring to correspondingly lengthen a borehole, once the length of the stand has been drilled, another length of stand may be added to the drillstring. Such a process may be referred to as making a connection. In drilling, making a connection may involve adding a length of drillpipe to a drillstring to continue drilling. In what is referred to as jointed pipe drilling, joints of drillpipe, each about 9 meters long, may be screwed together as a borehole is being drilled. When a drill bit on the end of the drillstring has drilled down to where the kelly or the top drive at the top of the drillstring nears the rig floor (e.g., drillfloor), the drillstring between the two is lengthened by adding a joint or a stand (e.g., usually three joints) to the drillstring. For example, consider a process involving a rig crew where, once the rig crew is ready, the driller stops rotation (e.g., rotary table or top drive), picks up the drillstring to expose a threaded connection below the kelly (e.g., rig floor) and turns off the mud pumps. In such an example, the rig crew sets slips to grip the drillstring temporarily, unscrews the threaded connection and screws the kelly (or top drive) into the additional joint (or stand) of pipe. The driller picks that joint or stand up to allow the rig crew to screw the bottom of that drillpipe into the top of the temporarily hanging drillstring. The driller then picks up the entire drillstring to allow for removal of the slips, followed by carefully lowering the drillstring while starting the mud pumps and rotary equipment to thereby resume drilling when the drill bit contacts the end of the borehole (e.g., bottom of the hole). In various instances, a skilled rig crew can physically accomplish making a connection in approximately a minute or two.

As explained, mud-pulse telemetry may be utilized as a method of transmitting data from one or more downhole tools (e.g., LWD tool, MWD tool, etc.) to surface. Mud-pulse telemetry involves using pressure pulses in the mud system (e.g., within drillpipe, in an annulus, etc.). As an example, measurements may be converted into an amplitude- or frequency-modulated pattern of mud pulses. As an example, mud-pulse telemetry system may be used to transmit commands from the surface to one or more downhole tools (e.g., LWD tool, MWD tool, mud motor, bent sub, RSS tool, etc.). As an example, geosteering may be performed using mud-pulse telemetry for transmission of one or more control commands from surface to downhole to cause one or more pieces of downhole equipment to perform one or more actions (e.g., to direct a drill bit in particular direction, etc.).

As an example, a real-time process for characterizing a subsurface region using seismic data and LWD resistivity data may be performed according to a telemetry time and a computational time. As to a telemetry time, it may depend on different aspects of the borehole, such as length and well inclination. Moreover, it can depend on the type of downhole telemetry hardware, drilling mechanics conditions, and surface equipment. As to a computational time, it may depend on available computational resources. As an example, where a drillstring includes computational resources sufficient to perform such characterizing, telemetry time may be minimal, whether accomplished via wire and/or mud-pulse technologies. As an example, a drillstring may include one or more components with computational resources sufficient to implement at least a portion of a framework, which may provide, for example, generation of control commands for geosteering. In such an approach, geosteering may be performed using downhole computations without delay (e.g., latency) associated with transmissions uphole (e.g., to surface) and/or downhole (e.g., to relevant downhole equipment of a drillstring).

As explained, in instances where resources may be limited and demand some amount of surface computations (e.g., given availability of greater computational resources at surface), autonomous geosteering may be performed by transmitting downhole data to surface, performing computations at surface to determine one or more steering commands, and then transmitting the one or more steering commands downhole for implementation by one or more downhole tools, systems, etc. Where a mud column may be utilized as a transmission medium, mud-pulse telemetry and/or one or more other mud-based techniques may be implemented. As an example, downlinking may be a process whereby commands at surface are transmitted downhole, for example, to instruct an RSS to steer a drill bit in a particular direction.

Figure 15:
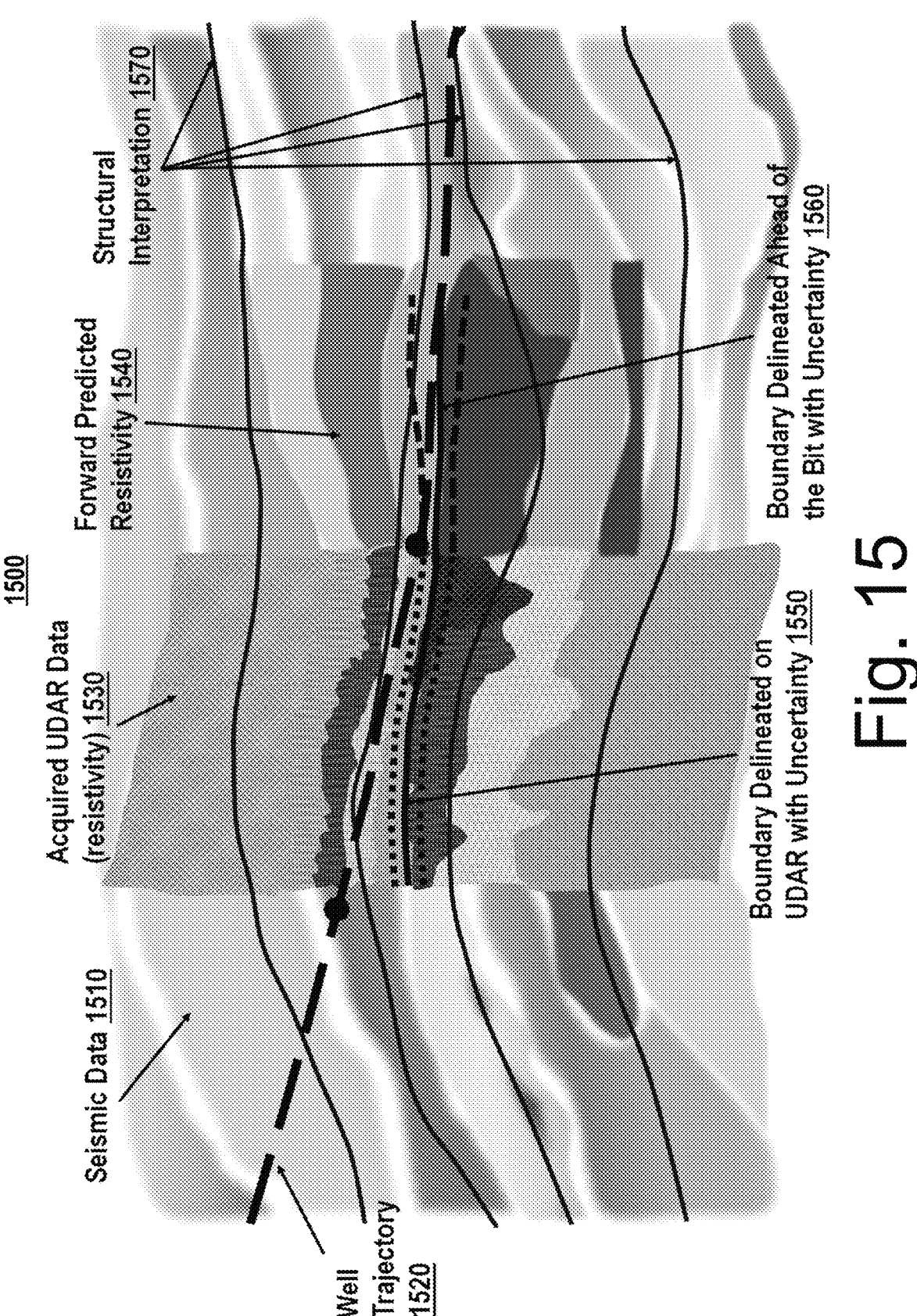
FIG. 15 illustrates an example of a graphical user interface.

FIG. 15 shows an example of a GUI 1500 that includes various outputs in an integrated visualization. In particular, in the example GUI 1500, the visualization integrates surfaces and values for one or more properties, which may be presented spatially with respect to a borehole.

In the example of FIG. 15, the GUI 1500 may provide for rendering of seismic data 1510, a well trajectory 1520 (e.g., a borehole as drilled and/or planned to be drilled), acquired UDAR data (e.g., resistivity) 1530, forward predicted resistivity 1540, a boundary delineated on UDAR with uncertainty bounds 1550, a boundary delineated ahead of a bit with uncertainty bounds 1560, and structural interpretations 1570 (e.g., behind and ahead of a bit, etc.). As an example, the GUI 1500 may be generated and rendered to a display operatively coupled to a computing system. For example, consider a display that may be on-site in a cabin where a driller, a directional driller, and an interpreter may be present for decision-making, controlling equipment, etc. In such an example, the driller may be responsible for rig operations (e.g., rotational speed, weight-on-bit, mud flow rate, etc.), the directional driller may be responsible for making steering decisions, and the interpreter may be responsible for data acquisition, processing, ang GUI rendering. As explained, one or more tasks may be automated, which may be according to a level of automation selected from a number of levels that may range from effectively manual operation to fully autonomous operation.

As an example, inputs and/or outputs may be utilized to generate a visualization in a curtain section view of one or more properties. For example, consider a PETREL framework curtain section view. As explained, a framework may provide for generation of reservoir characterization values and/or productivity values. As an example, a framework may provide for rendering of such values, in combination or separately.

As an example, an integrated workflow may be suitable for receipt of various types of resistivity data, which may be available via one or more downhole tools and/or one or more applications that may process such data. As an example, consider resistivity data and/or results that may be from a tool and/or a service that may provide for 1D inversion, 2D longitudinal inversion, 2D transverse inversion, 3D volumes, etc. As mentioned, an application such as an ultra-deep azimuthal resistivity (UDAR) framework may be utilized, which may be considered to be a service.

As an example, a framework may provide for implementation of an automated mode where, for example, the framework responds to receipt of real-time data (e.g., as transmitted using mud-pulse telemetry, wired pipe, etc.). In such an example, the framework may provide for generation of output that may be readily consumed for purposes of improved geosteering, etc. (e.g., consider QC output, metric output, structural feature output, etc.).

As an example, a framework may be utilized in combination with one or more other frameworks. For example, consider utilization of the PETREL framework, which may provide for data access for pre-job modeling. As an example, during drilling, a framework may be implemented in combination with the DRILLOPS framework. As an example, a framework may include one or more components for automation, for example, consider an autodriller (AD) as a type of automated component or set of components. As an example, drilling tasks, geosteering tasks and/or interpretation tasks may be automated.

As an example, a framework may implement a machine learning model trained using data from a number of offset wells where the machine learning model may be trained and implemented without testing of the machine learning model.

As an example, a tool string may include an embedded framework that may provide for downhole automated control of one or more operations of the tool string, which may include, for example, geosteering. As an example, a rig control system (RCS) may include an embedded framework that may provide for control of one or more operations, which may include, for example, geosteering. In such an example, one or more levels of automation may be implemented such that the framework forms part of a control loop, which may be a closed control loop and/or a human-in-the-loop (HITL) type of control loop. As an example, a cloud platform may be utilized for one or more purposes. As an example, where a model is to be updated, an updated model may be provided via one or more environments for implementation in the field, for example, at a rig site environment and/or in a tool string environment.

As an example, one or more components of a framework may utilize one or more machine learning models. For example, consider a machine learning model that may be utilized to assess, compare, match, etc., one or more datasets, types of data, etc. As an example, an image-based approach may be utilized, which may provide for single or multidimensional reservoir property generation and/or application.

As explained, knowledge of what lies ahead can be beneficial in drilling, particularly where the knowledge of what lies ahead extends a sufficient distance (in one or more dimensions) to meaningfully allow for practical decisions in drilling. As an example, a framework may provide for real-time and/or near real-time output that is actionable given constraints in drilling, which may include ROP, borehole quality, length of stands, number of drillpipes per stand, etc. As an example, a framework may provide for at least a stand ahead improved view of a subsurface region with respect to at least one or more properties. As an example, consider a two to three stands ahead improved view of a subsurface region, where, for example, the view may be accompanied by uncertainty, which may facilitate decision-making, control, etc., of drilling.

As to types of machine learning models, consider one or more of a support vector machine (SVM) model, a k-nearest neighbors (KNN) model, an ensemble classifier model, a neural network (NN) model, etc. As an example, a machine learning model may be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model (ML model), may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open-source software library for dataflow programming that includes a symbolic math library, which may be implemented for machine learning applications that may include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method may include various actions that may operate on a dataset to train an ML model. As an example, a dataset may be split into training data and test data where test data may provide for evaluation. A method may include cross-validation of parameters and best parameters, which may be provided for model training.

The TENSORFLOW framework may run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSOR-FLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system-based platforms.

TENSORFLOW computations may be expressed as stateful dataflow graphs; noting that the name TENSORFLOW derives from the operations that such neural networks perform on multidimensional data arrays. Such arrays may be referred to as "tensors".

As an example, a device may utilize TENSORFLOW LITE (TFL) or another type of lightweight framework. For example, consider a gateway that may be in the field (e.g., on-site) and that may utilize the TFL and/or one or more other types of lightweight frameworks. The TFL framework is a set of tools that enables on-device machine learning where models may run on mobile, embedded, and IoT devices. The TFL framework is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). The TFL framework offers multiple platform support, covering ANDROID and iOS devices, embedded LINUX, and microcontrollers. The TFL framework offers diverse language support includes JAVA, SWIFT, Objective-C, C++, and PYTHON. The TFL framework may provide high performance via hardware acceleration and model optimization.

Figure 16:
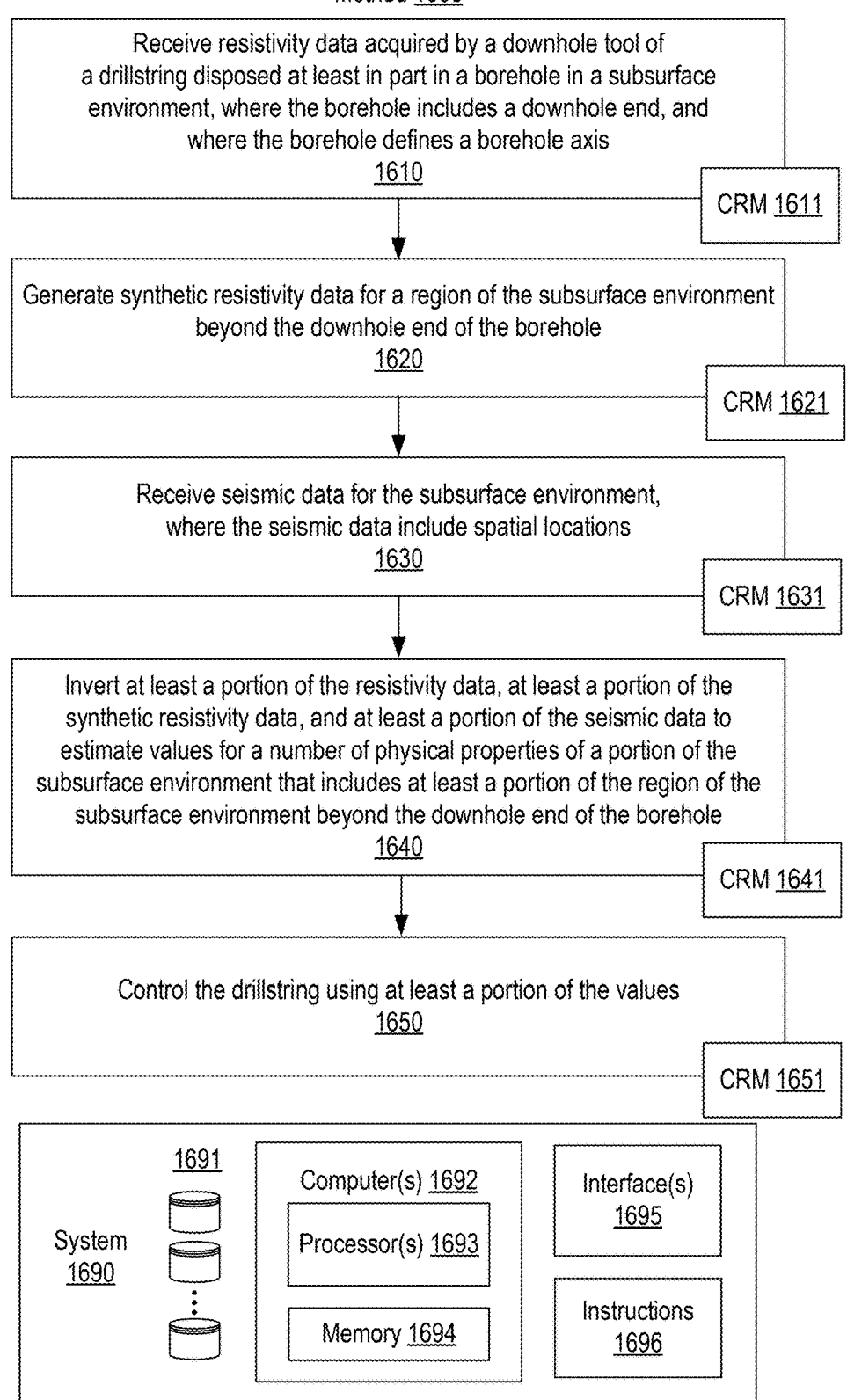
FIG. 16 illustrates an example of a method and an example of a system.

FIG. 16 shows an example of a method 1600 that includes a reception block 1610 for receiving resistivity data acquired by a downhole tool of a drillstring disposed at least in part in a borehole in a subsurface environment, where the borehole includes a downhole end, and where the borehole defines a borehole axis; a generation block 1620 for generating synthetic resistivity data for a region of the subsurface environment beyond the downhole end of the borehole, where the generating synthetic resistivity includes using at least a portion of the resistivity data; a reception block 1630 for receiving seismic data for the subsurface environment, where the seismic data include spatial locations; an inversion block 1640 for inverting at least a portion of the resistivity data, at least a portion of the synthetic resistivity data, and at least a portion of the seismic data to estimate values for a number of physical properties of a portion of the subsurface environment that includes at least a portion of the region of the subsurface environment beyond the downhole end of the borehole; and a control block 1650 for controlling the drillstring using at least a portion of the values. For example, consider controlling the drillstring to drill further into the subsurface environment to lengthen the borehole.

The method 1600 of FIG. 16 is shown as including various computer-readable storage medium (CRM) blocks 1611, 1621, 1631, 1641, and 1651 that may include processor-executable instructions that may instruct a computing system, which may be a control system, to perform one or more of the actions described with respect to the method 1600.

As shown in the example of FIG. 16, the system 1690 may include one or more computers 1692 that include one or more processors 1693, memory 1694 operatively coupled to at least one of the one or more processors 1693, instructions 1696 that may be, for example, stored in the memory 1694, and one or more interfaces 1695 (e.g., one or more network interfaces and/or other interfaces). As an example, the system 1690 may include one or more processor-readable media that include processor-executable instructions executable by at least one of the one or more processors 1693 to cause the system 1690 to perform actions such as, for example, one or more actions of the method 1600. As an example, the instructions 1696 may include instructions of one or more of the CRM blocks 1611, 1621, 1631, 1641, and 1651. The memory 1694 may be or include the one or more processor-readable media where the processor-executable instructions may be or include instructions. As an example, a processor-readable medium may be a computer-readable storage medium that is non-transitory that is not a signal and that is not a carrier wave.

As an example, the system 1690 may include subsystems. For example, the system 1690 may include a plurality of subsystems that may operate using equipment that is distributed where a subsystem may be referred to as being a system. For example, consider a downhole tool system and a surface system. As an example, operations of the blocks 1610, 1620, 1630, and 1640 of the method 1600 may be performed using a downhole tool system. As an example, operations of the block 1650 of the method 1600 may be performed using a downhole tool system (e.g., consider in integrated controller in a drillstring). The method 1600 may be implemented using, for example, a downhole system and/or a surface system, which may be a cloud-based or cloud-coupled system.

As to resistivity data, as explained, such data may be acquired using one or more downhole tools. For example, consider data in the form of time series data, timestamped data, etc., which may be in the form of amplitude, phase, etc. Information as to resistivity is inherent in raw data, which may be in the form of digitized analog signals (e.g., via an analog-to-digital converter (ADC), etc.). As explained, at surface, time referenced data may be transformed into depth referenced data where, for example, aspects as to amplitude, phase, etc., may be transformed into spatial resistivity values. As explained, spatial resistivity values may be derived for components of resistivity, which may be directional and, for example, depend on the nature of a medium (e.g., formation rock, etc.). As explained, resistivity may be defined using vertical (Rv) and horizontal (Rh) components, which may differ when a medium is not homogenous (e.g., purely isotropic).

As to generating synthetic resistivity data, as explained, this may be predicted data. As explained, one or more techniques may provide for predicting resistivity data in a region that may be outside a spatial range of a downhole tool, particularly in a region beyond an end of a borehole. As an example, generation of synthetic resistivity data may include use of one or more extrapolation techniques using actual resistivity data. For example, a correlation technique may be utilized that correlates actual resistivity data and actual acoustic impedance data (e.g., seismic data) for purposes of generating synthetic resistivity data in a region beyond an end of a borehole. Once resistivity data (e.g., actual and synthetic) and acoustic impedance data are available for an overall region, a joint inversion may be performed for that overall region to generate property values of that overall region.

As explained, a petrophysical joint inversion may be performed using resistivity data (e.g., actual and synthetic) and acoustic impedance (e.g., seismic data) to generate spatial values for porosity, water saturation, and volume of clay, where such spatial values are generated in a region about a borehole (e.g., using actual resistivity data and actual acoustic impedance data) and in a region beyond an end of the borehole (e.g., using synthetic resistivity data and actual acoustic impedance data). While actual and synthetic data are mentioned, given that a joint inversion operates as to a single structural model, actual data and synthetic data contribute to the resulting single structural model results. In such a manner, a distinct spatial division between the effects of actual and synthetic may not exist. As explained, a structural model may be a cell-based model where each cell is spatially located and can be assigned properties, such as, for example, porosity, water saturation, and volume of clay. As an example, an inversion process may be performed deterministically (e.g., via an optimization algorithm) and/or stochastically.

As to performing a joint inversion, results may be generated for desired property values along with uncertainty as to those values. For example, property values may be generated along with standard deviations thereof. While standard deviation is mentioned as an example of an uncertainty metric, one or more other types of statistical metrics may be generated, additionally or alternatively.

As an example, a GUI such as, for example, the GUI 1500 of FIG. 15, may be rendered with one or more indicators as to uncertainty. In such an approach, the GUI, when viewed by one or more operators (e.g., driller, directional driller, interpreter, etc.), may be informative as to where a boundary (e.g., bed interface, etc.) actually exists in a subsurface environment. In such an example, if uncertainty is high, steering may be performed to maintain a reasonably safe distance that may be greater than a reasonably safe distance for a low uncertainty. In other words, where uncertainty as to a structural surface is low (e.g., high certainty as to location), geosteering commands may be optimized more effectively; whereas, where certainty as to the structural surface is high (e.g., low certainty as to location), geosteering commands may be less optimal due to an increased safety margin.

While various implementations pertain to real-time geosteering, as an example, a method, a workflow, etc., may be applied to post-job data, for example, to assess a job after it has been performed. In such an example, an assessment may consider data from one or more sites (e.g., multiple boreholes, etc.). In such an example, a joint inversion scheme (e.g., for spatially joined regions) may generate distributions of physical properties in a relatively large region which may be utilized to assess, plan, drill, etc., operations for one or more existing wells and/or for one or more new wells.

As an example, a method can include receiving resistivity data acquired by a downhole tool of a drillstring disposed at least in part in a borehole in a subsurface environment, where the borehole includes a downhole end, and where the borehole defines a borehole axis; generating synthetic resistivity data for a region of the subsurface environment beyond the downhole end of the borehole, where the generating synthetic resistivity includes using at least a portion of the resistivity data; receiving seismic data for the subsurface environment, where the seismic data include spatial locations; inverting at least a portion of the resistivity data, at least a portion of the synthetic resistivity data, and at least a portion of the seismic data to estimate values for a number of physical properties of a portion of the subsurface environment that includes at least a portion of the region of the subsurface environment beyond the downhole end of the borehole; and controlling the drillstring using at least a portion of the values.

As an example, seismic data can include surface seismic data of a subsurface environment and/or borehole seismic data. As an example, seismic data can include acoustic impedance data.

As an example, a number of physical properties can include porosity, water saturation, and/or volume of clay. As an example, a number of physical properties can include porosity and one or more of water saturation and volume of clay. As an example, a number of physical properties can include volume of shale.

As an example, a method may include inverting that generates uncertainty metrics for a number of physical properties. In such an example, the method may include rendering one or more uncertainty metrics for one or more of the number of physical properties. In such an example, controlling of a drillstring may occur based at least in part on uncertainty as represented by one or more uncertainty metrics. For example, consider a method where a controller may operate at one or more levels of automation where if uncertainty is high, a lower level of automation may be implemented (e.g., selected manually or automatically). As an example, a lower level of automation may involve more human intervention or oversight than a higher level of automation.

As an example, a method can include controlling equipment that occurs in real-time responsive to receiving resistivity data. For example, upon receipt of resistivity data at surface, a method may be performed that involves an inversion using the resistivity data such that an understanding of a subsurface environment may be improved to thereby improve equipment control, which may include steering a drill bit in the subsurface environment to improve borehole quality (e.g., integrity, reservoir contact, etc.).

As an example, resistivity data may include vertical resistivity data and horizontal resistivity data. As explained, a subsurface environment may be isotropic or not. As an example, an anisotropic subsurface environment may be characterized using vertical resistivity data and horizontal resistivity data. As explained, a subsurface environment may be tilted with respect to vertical (e.g., a direction of gravity, etc.). In such a scenario, resistivity data may be utilized for determining tilt, change in tilt, etc. As an example, an inversion may provide for using tilt (e.g., dipping or dip angle) as a parameter. As explained, isotropy and/or anisotropy may be characteristics of a subsurface formation (e.g., a reservoir, etc.), along with, for example, dip of a layer, a zone, etc.

As an example, a method can include inverting that includes performing a joint inversion. As an example, inverting may include using one or more rock physics models for one or more lithologies of a subsurface environment. In such an example, a method may include segmenting at least a portion of the subsurface environment into zones, where each of the zones includes one of the one or more lithologies. As an example, a subsurface environment may include one or more isotropic zones and/or one or more anisotropic zones. As to an isotropic zone, vertical and horizontal resistivities may be substantially the same and not differ in a manner that depends on tilt of the isotropic zone with respect to vertical (e.g., as measured by a direction of gravity, etc.).

As an example, a method can include controlling a drillstring where such controlling includes geosteering.

As an example, a method can include controlling a drillstring in a manner that provides for optimizing reservoir contact between a borehole and a reservoir formation of a subsurface environment. As explained, controlling may aim to maintain a borehole a distance from one or more boundaries, interfaces, zones, etc., which may help to improve borehole integrity and/or reduce risk of borehole issues (e.g., borehole collapse, undesirable fluid intrusion, etc.).

As an example, a method can include receiving resistivity data where receiving the resistivity data is from a downhole logging while drilling tool via mud-pulse or wired-drill-pipe telemetries and where controlling a drillstring includes transmitting one or more control commands to one or more downhole tools using mud-pulse or wired-drill-pipe telemetries.

As an example, a system can include a processor; memory accessible to the processor; and processor-executable instructions stored in the memory and executable by the processor to instruct the system to: receive resistivity data acquired by a downhole tool of a drillstring disposed at least in part in a borehole in a subsurface environment, where the borehole includes a downhole end, and where the borehole defines a borehole axis; generate synthetic resistivity data for a region of the subsurface environment beyond the downhole end of the borehole, where the generating synthetic resistivity includes using at least a portion of the resistivity data; receive seismic data for the subsurface environment, where the seismic data include spatial locations; invert at least a portion of the resistivity data, at least a portion of the synthetic resistivity data, and at least a portion of the seismic data to estimate values for a number of physical properties of a portion of the subsurface environment that includes at least a portion of the region of the subsurface environment beyond the downhole end of the borehole; and control the drillstring using at least a portion of the values.

As an example, one or more non-transitory computer-readable storage media can include processor-executable instructions executable to instruct a processor to: receive resistivity data acquired by a downhole tool of a drillstring disposed at least in part in a borehole in a subsurface environment, where the borehole includes a downhole end, and where the borehole defines a borehole axis; generate synthetic resistivity data for a region of the subsurface environment beyond the downhole end of the borehole, where the generating synthetic resistivity includes using at least a portion of the resistivity data; receive seismic data for the subsurface environment, where the seismic data include spatial locations; invert at least a portion of the resistivity data, at least a portion of the synthetic resistivity data, and at least a portion of the seismic data to estimate values for a number of physical properties of a portion of the subsurface environment that includes at least a portion of the region of the subsurface environment beyond the downhole end of the borehole; and control the drillstring using at least a portion of the values.

As an example, one or more computer-readable storage media may include processor-executable instructions to instruct a computing system to perform one or more methods. In such an example, the one or more computer-readable storage media may be a program product (e.g., a computer program product, a computer system program product, etc.).

In some embodiments, a method or methods may be executed by a computing system. FIG. 17 shows an example of a system 1700 that may include one or more computing systems 1701-1, 1701-2, 1701-3 and 1701-4, which may be operatively coupled via one or more networks 1709, which may include wired and/or wireless networks.

As an example, a system may include an individual computer system or an arrangement of distributed computer systems. In the example of FIG. 17, the computer system 1701-1 may include one or more sets of instructions 1702, which may be or include processor-executable instructions, for example, executable to perform various tasks (e.g., receiving information, requesting information, processing information, simulation, outputting information, etc.).

As an example, a set of instructions may be executed independently, or in coordination with, one or more processors 1704, which is (or are) operatively coupled to one or more storage media 1706 (e.g., via wire, wirelessly, etc.). As an example, one or more of the one or more processors 1704 may be operatively coupled to at least one of one or more network interface 1707. In such an example, the computer system 1701-1 may transmit and/or receive information, for example, via the one or more networks 1709 (e.g., consider one or more of the Internet, a private network, a cellular network, a satellite network, etc.). As shown, one or more other components 1708 may be included.

As an example, the computer system 1701-1 may receive from and/or transmit information to one or more other devices, which may be or include, for example, one or more of the computer systems 1701-2, etc. A device may be located in a physical location that differs from that of the computer system 1701-1. As an example, a location may be, for example, a processing facility location, a data center location (e.g., server farm, etc.), a rig location, a wellsite location, a downhole location, etc.

As an example, a processor may be or include a microprocessor, microcontroller, processor component or subsystem, programmable integrated circuit, programmable gate array, or another control or computing device.

As an example, the storage media 1706 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that may be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

REFERENCES INCORPORATED BY
REFERENCE HEREIN IN THEIR ENTIRETY

Nickel et al., WO 2017/142,719 A1, Calibrating Seismic Data Using Measurements Made During Drilling Operations, published 24 Aug. 2017.

Salim et al., 2018, Geosteering Driven by Geophysics-Reservoir Structure Prediction Ahead of Bit, Second EAGE/SPE Geosteering and Well Placement Workshop, 5-8 November, Abu Dhabi, UAE.

Borgos et al., US 2019/0024501 A1, Seismic Inversion Constrained by Real-Time Measurements, published 24 Jan. 2019.

Tarchiani et al., 2017, Novel While-drilling Workflow for Reservoir Structural Prediction ahead of the Bit, 79th EAGE Conference and Exhibition 217 June 2017, Volume 2017, p. 1-5.

Seydoux et al., 2014, Full 3D Deep Directional Resistivity Measurements Optimize Well Placement and Provide Reservoir-Scale Imaging While Drilling, Paper presented at the SPWLA 55th Annual Logging Symposium, Abu Dhabi, United Arab Emirates, May 2014.

Miotti et al., 2010, Estimation of rock properties from Seismic, EM and gravity well-log measurements, EGM 2010 International Workshop, April 2010, cp-165-00063.

Giraud et al., 2013, Simultaneous joint inversion of electromagnetic and seismic full-waveform data: A sensitivity analysis to Biot parameter formulation, 75th Conference & Exhibition, EAGE, Extended Abstracts, 68614.

Dell'Aversana et al., 2011, Joint inversion of rock properties from sonic, resistivity and density well-log measurements: Geophysical Prospecting, 59:1144-1154.

Miotti et al., 2013, Petrophysical Joint Inversion of seismic and EM attributes: a case study, SEG Technical Program Expanded Abstracts 2013. August 2013, 2516-2521.

Bachrach, R., 2006, Joint estimation of porosity and saturation using stochastic rock physics modeling, GEOPHYSICS 2006 71:5, O53-O63.

Barclay et al., 2008, Seismic inversion: Reading between the lines, March 2008 Oilfield Review 20 (1): 42-63.

Carcione et al., 2007, Cross-property relations between electrical conductivity and the seismic velocity of rocks, GEOPHYSICS 2007 72:5, E193-E204.

Bachrach, R., 2011, Elastic and resistivity anisotropy of shale during compaction and diagenesis: Joint effective medium modeling and field observations, GEOPHYSICS 2011 76:6, E175-E186.

Clavaud, J-B., 2008, Intrinsic Electrical Anisotropy of Shale: The Effect of Compaction, PETROPHYSICS, VOL. 49, NO. 3 (June 2008); P. 243-260

Simandoux, P., 1963, Dielectric measurements in porous media and application to shaly formation: Revue del'Institut Francais du Petrole. Suppl. Issue 1963, 18, 193-215.

Grana, D., 2018, Joint facies and reservoir properties inversion, Geophysics 2018; 83 (3): M15-M24.

Krief et al., 1990, A petrophysical interpretation using the velocities of P and S waves (Full-waveform sonic), The Log Analyst, 31, 355-369.

What is claimed is:

1. A method comprising:
receiving resistivity data acquired by a downhole tool of a drillstring disposed in a borehole in a subsurface environment, wherein the borehole comprises a downhole end, the borehole defines a borehole axis, and the resistivity data is collected uphole of the downhole end of the borehole;

generating, using at least a portion of the resistivity data, synthetic resistivity data for a region of the subsurface environment beyond the downhole end of the borehole;

receiving seismic data for the subsurface environment, wherein the seismic data comprise spatial locations;

applying a joint inversion to at least a portion of the resistivity data uphole of the downhole end of the borehole, at least a portion of the synthetic resistivity data downhole of the downhole end of the borehole, and at least a portion of the seismic data to estimate values for physical properties of a portion of the subsurface environment that includes at least a portion of the region of the subsurface environment beyond the downhole end of the borehole;

based on the physical properties beyond the downhole end of the borehole, identifying an adjustment to a wellbore trajectory to stay within a target area of the subsurface environment beyond the downhole end of the borehole; and actuating one or more geosteering actuators to adjust a tool trajectory of the downhole tool according to the adjustment to follow the wellbore trajectory and stay within the target area.

2. The method of claim 1, wherein the seismic data comprise surface seismic data of the subsurface environment.

3. The method of claim 1, wherein the seismic data comprise borehole seismic data.

4. The method of claim 1, wherein the seismic data comprise acoustic impedance data.

5. The method of claim 1, wherein the physical properties comprise porosity.

6. The method of claim 1, wherein the physical properties comprise water saturation.

7. The method of claim 1, wherein the physical properties comprise volume of clay.

8. The method of claim 1, wherein the physical properties comprise porosity and one or more of water saturation and volume of clay.

9. The method of claim 1, wherein the physical properties comprise volume of shale.

10. The method of claim 1, wherein applying the joint inversion includes generating uncertainty metrics for the physical properties.

11. The method of claim 1, wherein identifying the adjustment to the wellbore trajectory includes identifying the wellbore trajectory in real-time responsive to the receiving of the resistivity data.

12. The method of claim 1, wherein the resistivity data comprise vertical resistivity data and horizontal resistivity data.

13. The method of claim 1, wherein applying the joint inversion includes applying the joint inversion using one or more rock physics models for one or more lithologies of the subsurface environment.

14. The method of claim 13, comprising segmenting at least a portion of the subsurface environment into zones, wherein each of the zones comprises one of the one or more lithologies.

15. The method of claim 1, wherein identifying the adjustment to the wellbore trajectory to stay within the target area includes optimizing reservoir contact between the borehole and a reservoir formation of the subsurface environment.

16. The method of claim 1, wherein receiving the resistivity data comprises receiving the resistivity data from a downhole logging while drilling tool via mud-pulse telemetry or wired-drill-pipe telemetry and further comprising transmitting the adjustment to one or more downhole tools using the mud-pulse telemetry or the wired-drill-pipe telemetry.

17. The method of claim 1, wherein applying the joint inversion includes applying the joint inversion simultaneously to the resistivity data, the synthetic resistivity data, and the seismic data.

18. The method of claim 1, wherein there is no distinct spatial division between effects of the resistivity data and the synthetic resistivity data.

19. A system comprising:

a processor;

memory accessible to the processor; and processor-executable instructions stored in the memory and executable by the processor to instruct the system to:

receive resistivity data acquired by a downhole tool of a drillstring disposed in a borehole in a subsurface environment, wherein the borehole comprises a downhole end, the borehole defines a borehole axis, and the resistivity data is collected uphole of the downhole end of the borehole;

generate, using at least a portion of the resistivity data, synthetic resistivity data for a region of the subsurface environment beyond the downhole end of the borehole;

receive seismic data for the subsurface environment, wherein the seismic data comprise spatial locations;

apply a joint inversion to at least a portion of the resistivity data uphole of the downhole end of the borehole, at least a portion of the synthetic resistivity data downhole of the downhole end of the borehole, and at least a portion of the seismic data to estimate values for physical properties of a portion of the subsurface environment that includes at least a portion of the region of the subsurface environment beyond the downhole end of the borehole;

based on the physical properties beyond the downhole end of the borehole, identify an adjustment to a wellbore trajectory to stay within a target area of the subsurface environment beyond the downhole end of the borehole; and actuate one or more geosteering actuators to adjust a tool trajectory of the downhole tool according to the adjustment to follow the wellbore trajectory and stay within the target area.

20. One or more non-transitory computer-readable storage media comprising processor-executable instructions executable to instruct a processor to:

receive resistivity data acquired by a downhole tool of a drillstring disposed in a borehole in a subsurface environment, wherein the borehole comprises a downhole end, the borehole defines a borehole axis, and the resistivity data is collected uphole of the downhole end of the borehole;

generate, using at least a portion of the resistivity data, synthetic resistivity data for a region of the subsurface environment beyond the downhole end of the borehole;

receive seismic data for the subsurface environment, wherein the seismic data comprise spatial locations;

apply a joint inversion to at least a portion of the resistivity data uphole of the downhole end of the borehole, at least a portion of the synthetic resistivity data downhole of the downhole end of the borehole, and at least a portion of the seismic data to estimate values for physical properties of a portion of the subsurface environment that includes at least a portion of the region of the subsurface environment beyond the downhole end of the borehole;

based on the physical properties beyond the downhole end of the borehole, identify an adjustment to a wellbore trajectory to stay within a target area of the subsurface environment beyond the downhole end of the borehole; and actuate one or more geosteering actuators to adjust a tool trajectory of the downhole tool according to the adjustment to follow the wellbore trajectory and stay within the target area.

* * * * *